US012782946B2

(12) United States Patent
De Masi et al.

(10) Patent No.: US 12,782,946 B2
(45) Date of Patent: Nov. 3, 2026

(54) UNDERWATER SWARM OF ROBOTIC FISH FOR MONITORING AND TELEPRESENCE

(71) Applicants: Technology Innovation Institute—Sole Proprietorship LLC, Masdar City (AE); Khalifa University of Science and Technology, Abu Dhabi (AE)

(72) Inventors: Giulia De Masi, Abu Dhabi (AE); Cesare Stefanini, Pisa (IT); Federico Renda, Abu Dhabi (AE); Saverio Iacoponi, Abu Dhabi (AE); Enrico Natalizio, Abu Dhabi (AE)

(73) Assignees: Technology Innovation Institute—Sole Proprietorship LLC, Masdar City (AE); Khalifa University of Science and Technology, Abu Dhabi (AE)

( * ) Notice: Subject to any disclaimer, the term of this patent is extended or adjusted under 35 U.S.C. 154(b) by 43 days.

(21) Appl. No.: 18/904,288

(22) Filed: Oct. 2, 2024

(65) Prior Publication Data

US 2025/0123627 A1 Apr. 17, 2025

(30) Foreign Application Priority Data

Oct. 17, 2023 (IT) ........................ 102023000021567

(51) Int. Cl.
*G05D 1/224* (2024.01)
*B63G 8/00* (2006.01)
(Continued)

(52) U.S. Cl.
CPC ........... *G05D 1/2245* (2024.01); *B63G 8/001* (2013.01); *B63G 8/08* (2013.01); *B63G 8/38* (2013.01);
(Continued)

(58) Field of Classification Search
CPC .... G05D 1/2245; G05D 1/69; G05D 2105/87; G05D 2109/38; H04N 19/42;
(Continued)

(56) References Cited

U.S. PATENT DOCUMENTS 11,405,548 B1 * 8/2022 Sapp ........................ B60R 1/002
11,511,835 B2 11/2022 Kim et al.
(Continued)

FOREIGN PATENT DOCUMENTS

CN 107856824 3/2018
WO WO-2018231273 A1 * 12/2018 ............. B63B 23/10
WO 2021229471 11/2021

OTHER PUBLICATIONS

International Search Report and Written Opinion for International Application No. PCT/IB2024/059651, mailed Dec. 12, 2024, 13 Pages.

(Continued)

*Primary Examiner* — Fadey S. Jabr
*Assistant Examiner* — Ahmed Alkirsh
(74) *Attorney, Agent, or Firm* — DLA Piper LLP (US)

(57) ABSTRACT

A system of underwater swarm of robotic fish for monitoring and telepresence. The system comprising a floating platform communicatively coupled to a controller, a submersible sinker communicatively coupled to the floating platform, and a plurality of underwater drones communicatively coupled to the submersible sinker. The controller is configured to receive instructions from an operator for remotely exploring an underwater environment using the submersible sinker and the plurality of underwater drones, transmit the instructions to the plurality of underwater drones via the floating platform and the submersible sinker, the instructions directing the plurality of underwater drones to navigate the underwater environment and collect data, receive the col- (Continued)

lected data from the plurality of underwater drones via the floating platform and the submersible sinker, and display the collected data to the operator via a virtual display.

18 Claims, 18 Drawing Sheets

(51) Int. Cl.

| | |
|---|---|
| ***B63G 8/08*** | (2006.01) |
| ***B63G 8/38*** | (2006.01) |
| ***G05D 1/69*** | (2024.01) |
| ***G05D 105/80*** | (2024.01) |
| ***G05D 109/30*** | (2024.01) |
| ***H04N 7/18*** | (2006.01) |
| ***H04N 19/42*** | (2014.01) |
| ***H04N 23/90*** | (2023.01) |

(52) U.S. Cl.
CPC ............... *G05D 1/69* (2024.01); *H04N 7/181* (2013.01); *H04N 19/42* (2014.11); *H04N 23/90* (2023.01); *B63G 2008/004* (2013.01); *G05D 2105/87* (2024.01); *G05D 2109/38* (2024.01)

(58) Field of Classification Search
CPC ........ H04N 23/90; H04N 7/181; B63G 8/001; B63G 8/08; B63G 8/38; B63G 2008/004
USPC .............................................................. 701/2
See application file for complete search history.

(56) References Cited

U.S. PATENT DOCUMENTS

| | | | | |
|---|---|---|---|---|
| 11,919,636 | B2 * | 3/2024 | Clark | B60F 5/02 |
| 2004/0030449 | A1 * | 2/2004 | Solomon | F41H 13/00 700/248 |
| 2008/0300821 | A1 | 12/2008 | Frank et al. | |
| 2012/0170935 | A1 | 7/2012 | Machado et al. | |
| 2015/0326570 | A1 * | 11/2015 | Publicover | G02B 27/0093 382/117 |
| 2016/0376000 | A1 * | 12/2016 | Kohstall | B60F 5/02 114/313 |
| 2018/0370604 | A1 * | 12/2018 | Ichihara | B63B 22/12 |
| 2019/0061890 | A1 * | 2/2019 | Fiorello | B63G 8/08 |
| 2020/0262529 | A1 * | 8/2020 | Mahmoudian | B63C 11/52 |
| 2020/0385095 | A1 * | 12/2020 | Kim | B63C 11/48 |
| 2023/0192254 | A1 * | 6/2023 | Rautenbach | B63B 35/04 701/21 |
| 2023/0341851 | A1 * | 10/2023 | Liu | B25J 9/1671 |
| 2024/0007197 | A1 * | 1/2024 | Kong | H04B 10/80 |
| 2024/0132188 | A1 * | 4/2024 | Curet | B63H 1/37 |
| 2024/0160203 | A1 * | 5/2024 | Eggenberger | G05D 1/0027 |

OTHER PUBLICATIONS

Office Action of IT Patent Application No. 102023000021567, dated Jun. 18, 2024, 10 pages.
Iacoponi, et al., "H-surf: Heterogeneous swarm of underwater robotic fish," Oceans 2022, Hampton Roads. IEEE, 2022, 5 pages.
Iacoponi, et al., "Wireless teleoperation of HSURF artificial fish in complex paths," Oceans 2023-Limerick. IEEE, 2023, 5 pages.
Iacoponi, et al., "HSURF: A New Modular Platform for Underwater Remote Semi-Autonomous Facilities Inspection," Abu Dhabi International Petroleum Exhibition and Conference, SPE, 2023.
Iacoponi, et al., "Heterogeneous Underwater Swarm of Robotic Fish," IOP Conference Series: Materials Science and Engineering. vol. 1292. No. 1, IOP Publishing, 2023, 9 pages.
Office Action and Search Report for United Arab Emirates Patent Application No. P2024-02740, dated Dec. 12, 2025, 9 pages.

* cited by examiner

UNDERWATER SWARM OF ROBOTIC FISH FOR MONITORING AND TELEPRESENCE

CROSS-REFERENCE TO RELATED APPLICATIONS

This application claims priority to Italian Patent Application No. 102023000021567, filed Oct. 17, 2023, which is incorporated by reference in its entirety.

FIELD

A system and method for an underwater swarm of robotic fish for monitoring and telepresence.

BACKGROUND

Underwater environments are intrinsically remote and hard to access for inspection and monitoring purposes. Human missions can only last for a limited time due to a diver having a limited dive time for a specific mission. Moreover, each diving mission is affected by risks of improperly functioning diver equipment, which may lead to injury or death.

The use of remotely operated vehicles (ROV)s can replace the diver in many scenarios. However, conventional ROVs tend to be large, tethered vehicles that are expensive and have limited maneuverability to perform comprehensive inspections and monitoring of underwater structures.

SUMMARY

In one aspect, the present disclosure relates to a system of underwater swarm of robotic fish for monitoring and telepresence. The system comprising a floating platform communicatively coupled to a controller, a submersible sinker communicatively coupled to the floating platform, and a plurality of underwater drones communicatively coupled to the submersible sinker. The controller is configured to receive instructions from an operator for remotely exploring an underwater environment using the submersible sinker and the plurality of underwater drones, transmit the instructions to the plurality of underwater drones via the floating platform and the submersible sinker, the instructions directing the plurality of underwater drones to navigate the underwater environment and collect data, receive the collected data from the plurality of underwater drones via the floating platform and the submersible sinker, and display the collected data to the operator via a virtual display.

In embodiments of this aspect, the disclosed system according to any one of the above example embodiments, the floating platform comprises a wireless communication interface configured to wirelessly communicate with the controller, and a wired communication interface electrically connected to the submersible sinker located in the underwater environment.

In embodiments of this aspect, the disclosed system according to any one of the above example embodiments, the submersible sinker comprises an omnidirectional camera configured to capture omnidirectional images or video of the underwater environment.

In embodiments of this aspect, the disclosed system according to any one of the above example embodiments, the plurality of underwater drones each comprise a thruster propeller, a sensor for collecting the data, and a camera for capturing images of the underwater environment.

In embodiments of this aspect, the disclosed system according to any one of the above example embodiments, comprises a user input interface for providing the instructions to the controller for remotely exploring an underwater environment. The virtual display comprises a virtual reality (VR) headset worn by the operator to display the collected data to the operator and display images captured by at least one of the submersible sinker or the underwater drones.

In embodiments of this aspect, the disclosed system according to any one of the above example embodiments, wherein in response to the instructions, the submersible sinker reaches a desired water depth and captures images of the underwater environment and the plurality of underwater drones coordinate navigation throughout the underwater environment to collect the data.

In embodiments of this aspect, the disclosed system according to any one of the above example embodiments, the submersible sinker and the plurality of underwater drones have acoustic transceivers and optical transceivers for supporting communication in the underwater environment.

In embodiments of this aspect, the disclosed system according to any one of the above example embodiments, the underwater drones align with one another and the submersible sinker to position the optical transceivers in an optical chain to support optical communication in the underwater environment at long range and short-range configurations respectively.

In embodiments of this aspect, the disclosed system according to any one of the above example embodiments, the underwater drones are further configured to determine respective positions in the underwater environment by executing a beaconless algorithm that fuses dead reckoning data and relative trilateration data for collective localization.

In embodiments of this aspect, the disclosed system according to any one of the above example embodiments, the plurality of underwater drones are further configured to encode images in the collected data using an encoding algorithm and transmit the encoded images to the submersible sinker, the encoding algorithm comprising applying multiple convolutional layers until the images are compressed to a predetermined size, converting values of the compressed images to binary values and transmitting the binary values to the submersible sinker, and the encoding algorithm is trained by performing forward propagation and back propagation through a model using a predetermined dataset.

In one aspect, the present disclosure relates to a method of operating an underwater swarm of robotic fish for monitoring and telepresence. The method comprising receiving, by a controller, instructions from an operator for remotely exploring an underwater environment using a submersible sinker and a plurality of underwater drones, the controller communicatively coupled to a floating platform, the submersible sinker communicatively coupled to the floating platform, and the plurality of underwater drones communicatively coupled to the submersible sinker, transmitting, by the controller, the instructions to the plurality of underwater drones via the floating platform and the submersible sinker, the instructions directing the plurality of underwater drones to navigate the underwater environment and collect data, receiving, by the controller, the collected data from the plurality of underwater drones via the floating platform and the submersible sinker, and displaying, by the controller, the collected data to the operator via a virtual display.

In embodiments of this aspect, the disclosed method according to any one of the above example embodiments, further comprising wirelessly communicating between the floating platform and the controller via a wireless communication interface of the platform, and communicating between the floating platform and the submersible sinker located in the underwater environment via a wired connection between the floating platform and the submersible sinker.

In embodiments of this aspect, the disclosed method according to any one of the above example embodiments, further comprising capturing, by an omnidirectional camera of the submersible sinker, omnidirectional images or video of the underwater environment.

In embodiments of this aspect, the disclosed method according to any one of the above example embodiments, further comprising propelling, by a thruster propeller, the plurality of underwater drones through the underwater environment, and collecting the data, by a sensor of the plurality of underwater drones, and capturing images of the underwater environment by cameras of the plurality of underwater drones.

In embodiments of this aspect, the disclosed method according to any one of the above example embodiments, further comprising providing, by a user input interface, the instructions to the controller for remotely exploring an underwater environment, and displaying, by the virtual display comprising a virtual reality (VR) headset worn by the operator, the collected data to the operator and display images captured by at least one of the submersible sinker or the underwater drones.

In embodiments of this aspect, the disclosed method according to any one of the above example embodiments, further comprising capturing, by the submersible in response to the instructions, images of the underwater environment and the plurality of underwater drones coordinate navigation throughout the underwater environment to collect the data.

In embodiments of this aspect, the disclosed method according to any one of the above example embodiments, further comprising supporting, by acoustic transceivers and optical transceivers of the submersible sinker and the plurality of underwater drones, communication in the underwater environment.

In embodiments of this aspect, the disclosed method according to any one of the above example embodiments, further comprising aligning the underwater drones with one another and the submersible sinker to position the optical transceivers in an optical chain to support optical communication in the underwater environment.

In embodiments of this aspect, the disclosed method according to any one of the above example embodiments, further comprising determining, by the underwater drones, respective positions in the underwater environment by executing a beaconless algorithm that fuses dead reckoning data and relative trilateration data for collective localization.

In embodiments of this aspect, the disclosed method according to any one of the above example embodiments, further comprising training an encoding algorithm by performing forward propagation and back propagation through a model using a predetermined dataset of images, and encoding, by the plurality of underwater drones, the images in the collected data using the encoding algorithm that applies filters to the images in multiple convolutional layers until the images are compressed to a predetermined size, and converts values of the compressed images to binary values and transmitting the binary values to the submersible sinker, and transmitting, by the plurality of underwater drones, the encoded images to the submersible sinker.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1:
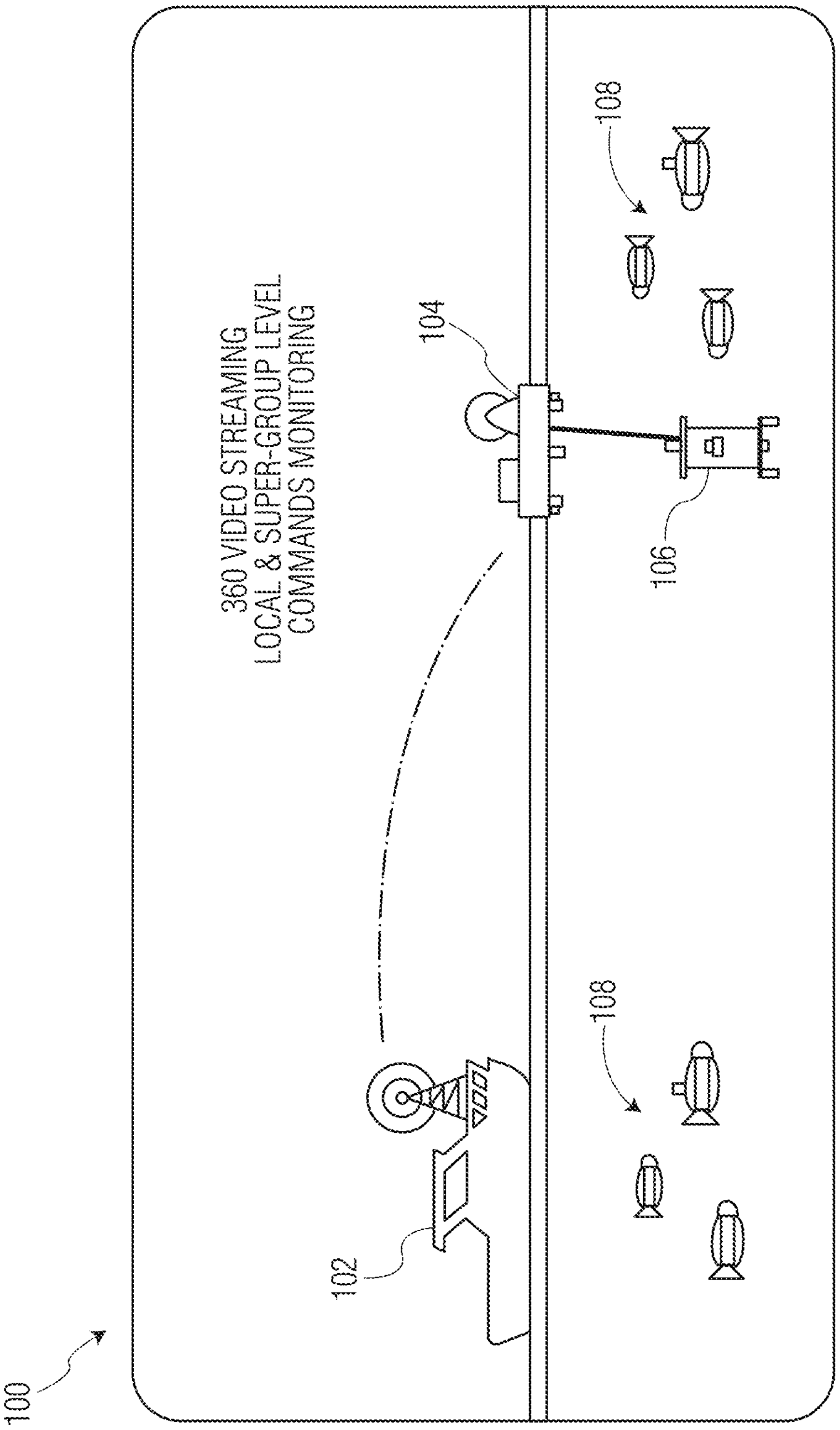
FIG. 1 shows a block diagram of a system of underwater swarm of robotic fish for monitoring and telepresence, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

Underwater exploration and monitoring are particularly challenging due to various factors including but not limited to the absence of GPS, limited communications, hydrodynamic pressures and other harsh environmental conditions (e.g., tight spaces, murky water with low visibility, chemical composition of water, etc.). Given properties of scalability, robustness, flexibility, adaptability, enlarged perception and task parallelization, autonomous swarms of underwater robots can play a beneficial role for missions such as wide area underwater exploration, environmental monitoring and inspection of the ocean floor and existing infrastructures such as oil and gas pipelines, archaeological or historical sites to name a few.

The disclosed methods, devices and systems herein overcome the limitations of the existing systems by providing a system/method of underwater swarm of underwater drones (e.g., robotic fish) for monitoring and telepresence to improve the performance of visual underwater surveys. One advantage lies in the possibility to parallelize the job among multiple agents (e.g., multiple robotic fish). This not only allows for lower operating times and lower costs, but also enables wide area studies when the time frame for the data acquisition impacts the measurements. Moreover, the swarm of robotic fish supports tasks allocation such that the robotic fish have different tasks performed at the same time independently or collaboratively. This also allows more flexibility during the mission, especially when the environmental conditions are dynamically changing, or when external factors impose a change of the mission.

Furthermore, underwater drones are susceptible to failure due to the difficult environment. A distributed approach offers a robustness to a mission, as the loss of functionality of a single underwater drone does not impede the mission itself. In addition, using a multi-drone approach uncovers new opportunities to challenge the issue of localization and path reconstruction. By fusing the information of the single agents, a collective localization can be achieved. A more traditional top-down control may also be included to allow the operator to interface with the swarm. The different control layers of the proposed architecture of the system are described in more detail below.

The underwater drones (e.g., swarm of robotic fish) are capable of freely moving underwater. Each of those underwater drones includes sensors that collect data and cameras that offer a Field of View (FOV) (e.g., 270-degree FOV). An unmanned surface vehicle, referred to as a floating platform, communicates with the underwater drones. The floating platform features an array of sensors, along with other features such as GNSS localization, an acoustic modem, downward pointing underwater camera, and wireless communication with the surface operators. Connected to the floating platform may be a second platform referred to as a sinker. The two platforms may be connected by a tether. A pulley system allows for autonomous deployment and retrieval of the sinker from the floating platform. The sinker may include features such as an array of sensors and modules as well, along with an acoustic modem and a 360° FOV array of cameras for producing an omnidirectional image or video feed for supporting a virtual reality environment experienced by an operator.

An example use case considers an end user (e.g., an operator of the system) utilizing a control station to interact with the underwater drones via the floating platform and sinker platforms. This allows the operator to be present (albeit virtually present) in the underwater environment, observe the environment and control the mission of the underwater drones. The communication between the floating platform and the base station may be based on wireless communications such as Wi-Fi technology, while the communication between floating platform and sinker may be wired (e.g., ethernet cable).

Most underwater communication may be handled via an acoustic channel between the sinker and the underwater drones. The acoustic channel can be shared among all agents (i.e., all robotic fish), so only one communication may be transmitted in broadcast mode at any moment for the whole swarm of underwater drones at once, unless the drones utilize different acoustic frequencies. Individual communications to specific underwater drones can be transmitted to a specific underwater drone (unicasting) or to a group of underwater drones (multicasting). The acoustic modem supported by the robotic fish may generally be limited in bandwidth. To achieve a higher rate of communication, different modes of communication may be implemented. For example, optical communication (e.g., using blue light wavelengths) may be utilized to offer higher bandwidth optical communication. The system can communicate via the acoustic channel, the optical channel or a combination of both depending on line-of-sight distances between the underwater drones.

FIG. 1 shows a block diagram 100 of a system of underwater swarm of robotic fish for monitoring and telepresence. As mentioned above, the system may include a control station 102, a floating platform 104 (i.e., floater), a submersible sinker 106 and a swarm of underwater drones (e.g., robotic fish). As is described in more detail below, the control station may include a user interface that allows the system operator to control operation of the underwater drones for exploring the underwater environment and allows the operator to experience the underwater environment in a virtual manner as if they were diving in the underwater environment. In other words, the operator can experience a virtual representation of the underwater environment. This may be accomplished by the operator utilizing an input device (e.g., joystick, trackball, buttons, etc.) and a virtual reality (VR) headset. During operation, control station 102 may send instructions instructing robotic fish 108 to explore a region of the underwater environment. These instructions may be transmitted from control station 102 to floating platform 104 via wired or wireless communications (e.g., Wi-Fi, etc.). Floating platform 104 may send the instructions to sinker 106 which then relays the instructions via an acoustic channel or optical channel to robotic fish 108.

The instructions may instruct robotic fish 108 to coordinate with each other and autonomously explore the environment to collect sensor data and images of a certain region or underwater structure of interest. The instructions may also control sinker 106 to capture images or video (e.g., omnidirectional images/video) of the underwater environment. The images captured by the sinker 106 and the robotic fish 108 may be relayed back to the control station where they are processed (e.g., stitched together in a panoramic image, etc.) to form a 360° virtual environment to be displayed on the operator VR headset. Data collected by sinker 106 and robotic fish 108 may also be relayed back to control station 102 and displayed to the operator. For example, information such as physical parameters (e.g., water depth, water pressure, water temperature, distances to objects and measurements of objects, etc.), chemical parameters (e.g., pollutant concentrations, etc.) and biological parameters (chlorophyll or organic matter concentrations, etc.) to name a few may be superimposed on the image being displayed on the VR headset. This gives the operator not only a visual of the environment as if they were diving in the underwater environment, but also provides the operator with useful information about the environment and structures in the environment.

Figure 2A:
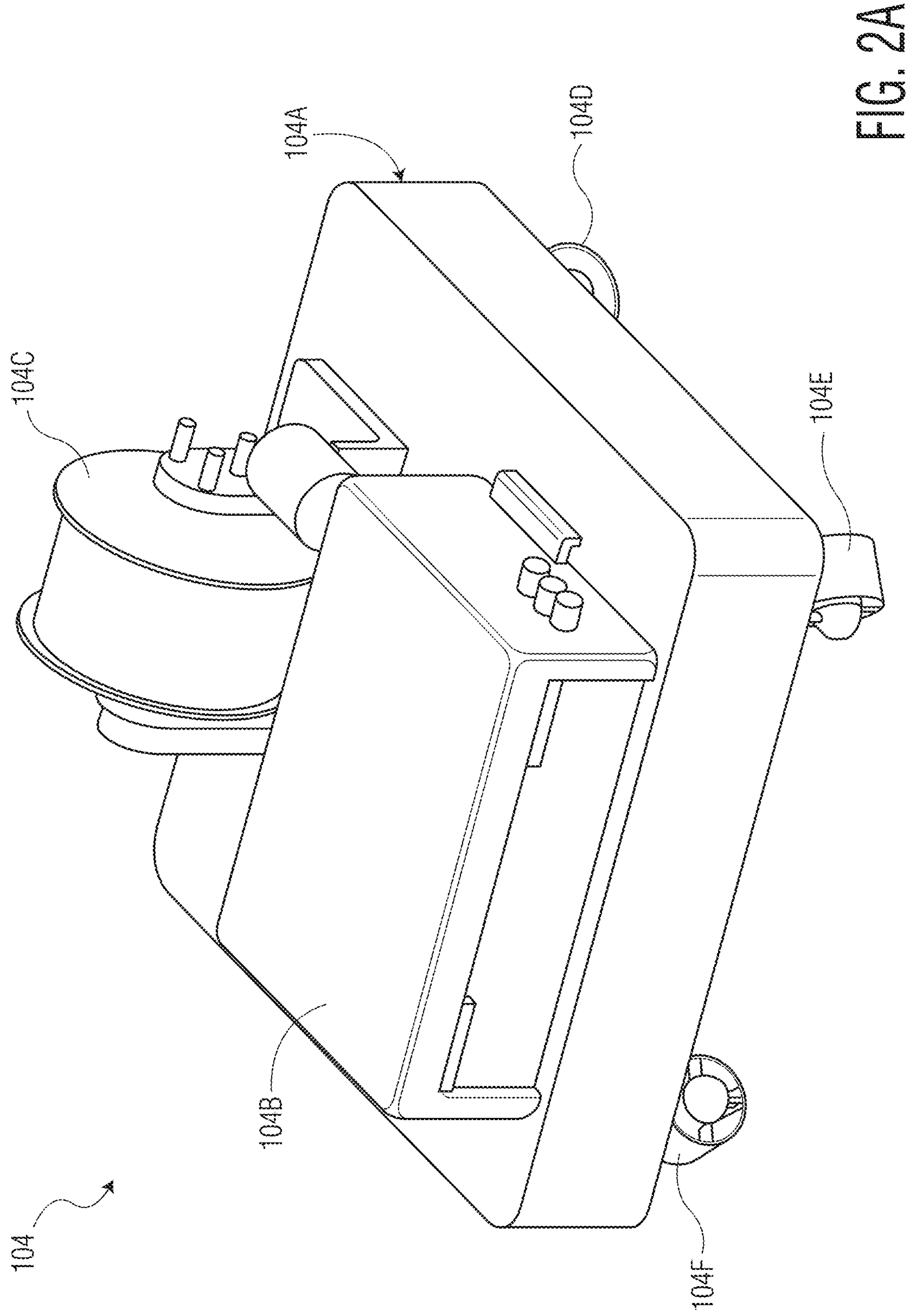
FIG. 2A shows a block diagram of the floating platform of the system of underwater swarm of robotic fish for monitoring and telepresence, according to an example embodiment of the present disclosure.

FIG. 2A shows a perspective view of the floating platform 104 of the system of underwater swarm of robotic fish for monitoring and telepresence. As mentioned above, floating platform 104 acts in part as an intermediary between the control station 102 and sinker 106. In other words, floating platform 104 relays communications (e.g., control instructions, captured data, etc.) between control station 102 and sinker 106. Floating platform 104 generally includes platform 104A having a shape, size and makeup for floating on the surface of the water and for supporting hardware components such as electronic circuits, sensors, communication equipment (e.g., modems, antennas, transceiver circuits, etc.) and the like. For example, electronic devices such as a controller, transceivers and sensors 104B may be mounted to floating platform 104A. Specifically, electronic devices and sensors 104B may be mounted in water-tight enclosures to protect sensitive components against moisture from breaking waves, rain and other harsh environmental factors. In FIG. 2A, floating platform 104A also includes a wired tether connection 104C to sinker 106. This wired tether connection may include a pully driven plastic cable for positioning and holding sinker 106 at a certain depth in the underwater environment, and a communication cable (e.g., ethernet cable) for communicatively coupling the electronic devise of floating platform 104A to sinker 106. Although not shown in FIG. 2A, floating platform 104A may also include an acoustic modem and a camera under the platform for capturing underwater images of the environment directly below floating platform 104A. Moreover multiple (e.g., 4) thrusters 104D, 104E and 104F allow navigation in autonomous and controlled mode. For example, the floater can be manually steered to a desired location or given position instructions, at which point the floater may use on on-board GPS receiver to autonomously control the thrusters to move to a desired location.

Figure 2B:
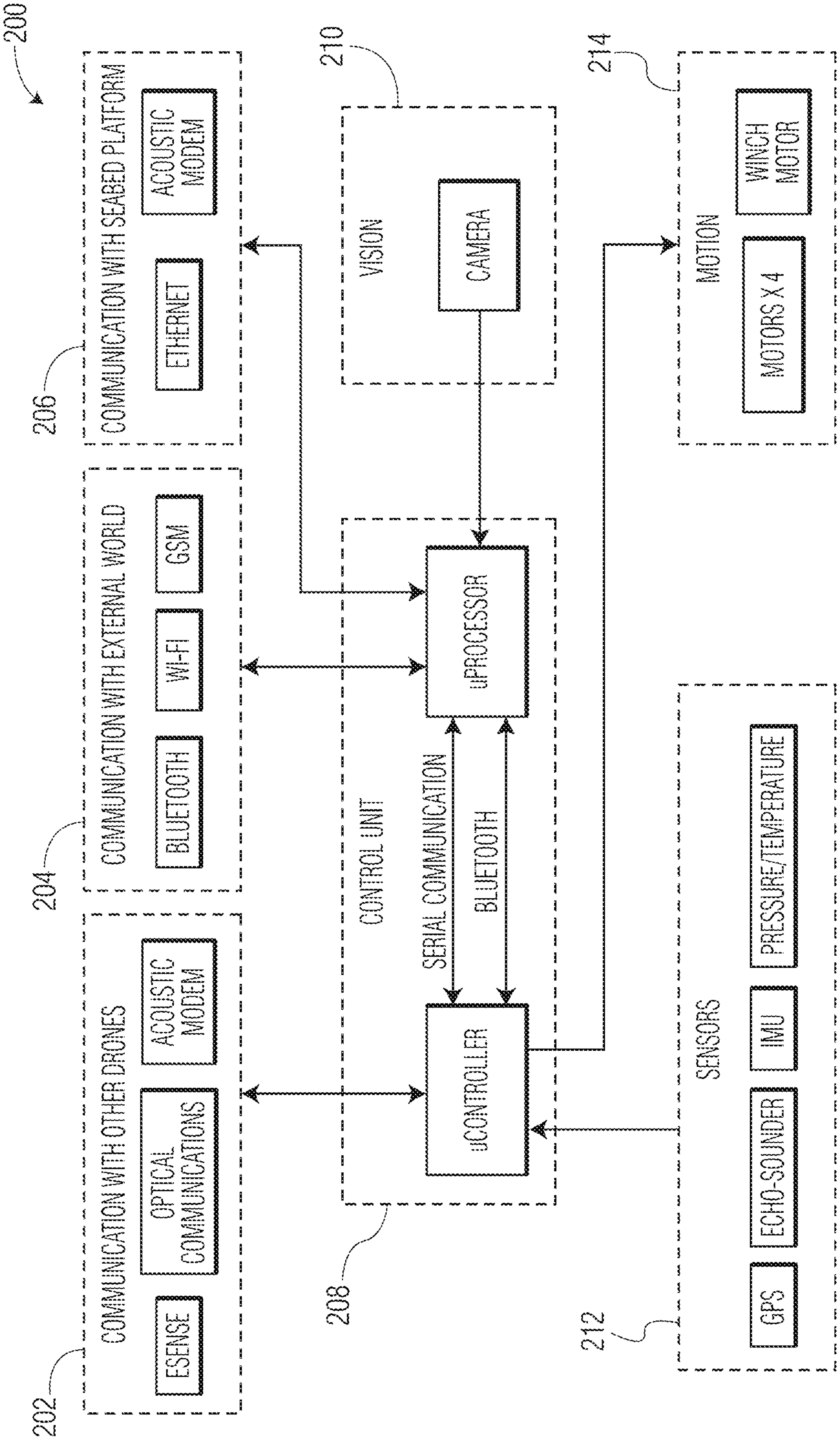
FIG. 2B shows a block diagram of hardware for the floating platform, according to an example embodiment of the present disclosure.

FIG. 2B shows a block diagram 200 of the hardware components of the floating platform. Included are underwater communication devices 202 and 206 for facilitating underwater communications with the sinker and drones, above-water communication devices 204 for facilitating communication with the control station, controller 208 for controlling the floating platform, camera(s) 210 for capturing underwater images below the platform, various above-water and underwater sensors 212 for monitoring position and sea conditions, and motion devices 214 for propelling the platform and controlling submersion of the sinker.

Figure 3A:
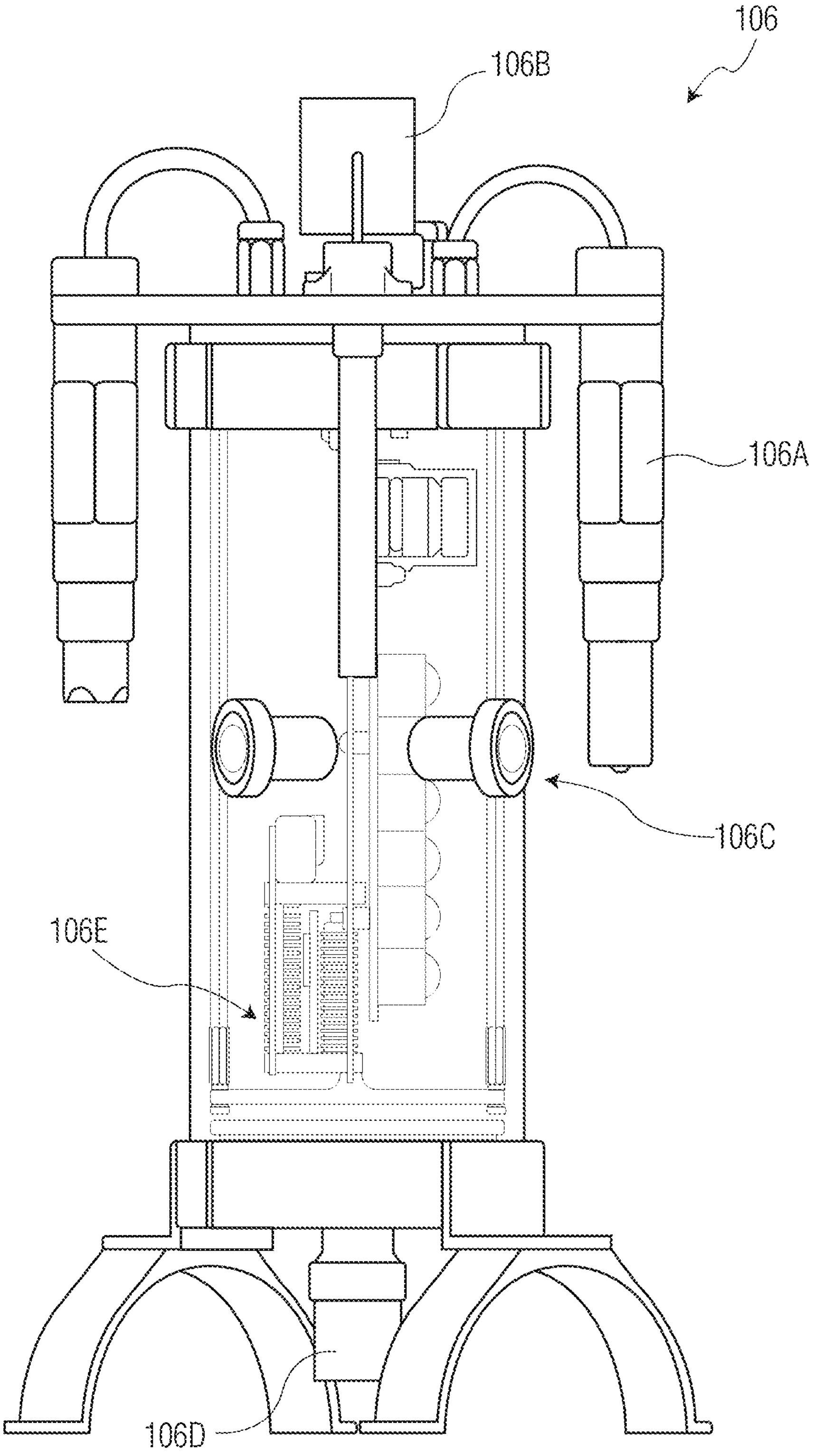
FIG. 3A shows a block diagram of the sinker of the system of underwater swarm of robotic fish for monitoring and telepresence, according to an example embodiment of the present disclosure.

As mentioned above, floating platform 104A can be tethered to sinker 106. FIG. 3A shows a perspective view of the sinker 106 of the system of underwater swarm of robotic fish for monitoring and telepresence. In one example, sinker 106 includes sensors 106A for collecting underwater data, acoustic transceiver 106B for communicating with the robotic fish via an acoustic channel, cameras 106C (e.g., omnidirectional camera array) for capturing images of the underwater environment, echosounder 106D to measure the distance from the sea floor and an optical transceiver for communicating with the robotic fish via an optical line-of-sight channel. Specifically, sensors 106A, acoustic transceiver 106B, cameras 106C echosounder 106D and electrical circuit board 106E (including electrical devices such as an optical transceiver, power electronics, and control circuits including a processor) may be housed in water-tight housings which are electrically connected to one another via wires and the like. Although not shown in FIG. 3A, sinker 106 can include the wired tether connection to floating platform 104A. As described, this wired tether may include a pully driven plastic cable for positioning and holding sinker 106 at a certain depth in the underwater environment, and a communication cable (e.g., ethernet cable) for communicatively coupling the electronic devise of floating platform 104A to sinker 106. The wired tether connection may be connected to the top portion of the sinker 106 as shown in FIG. 3A.

Figure 3B:
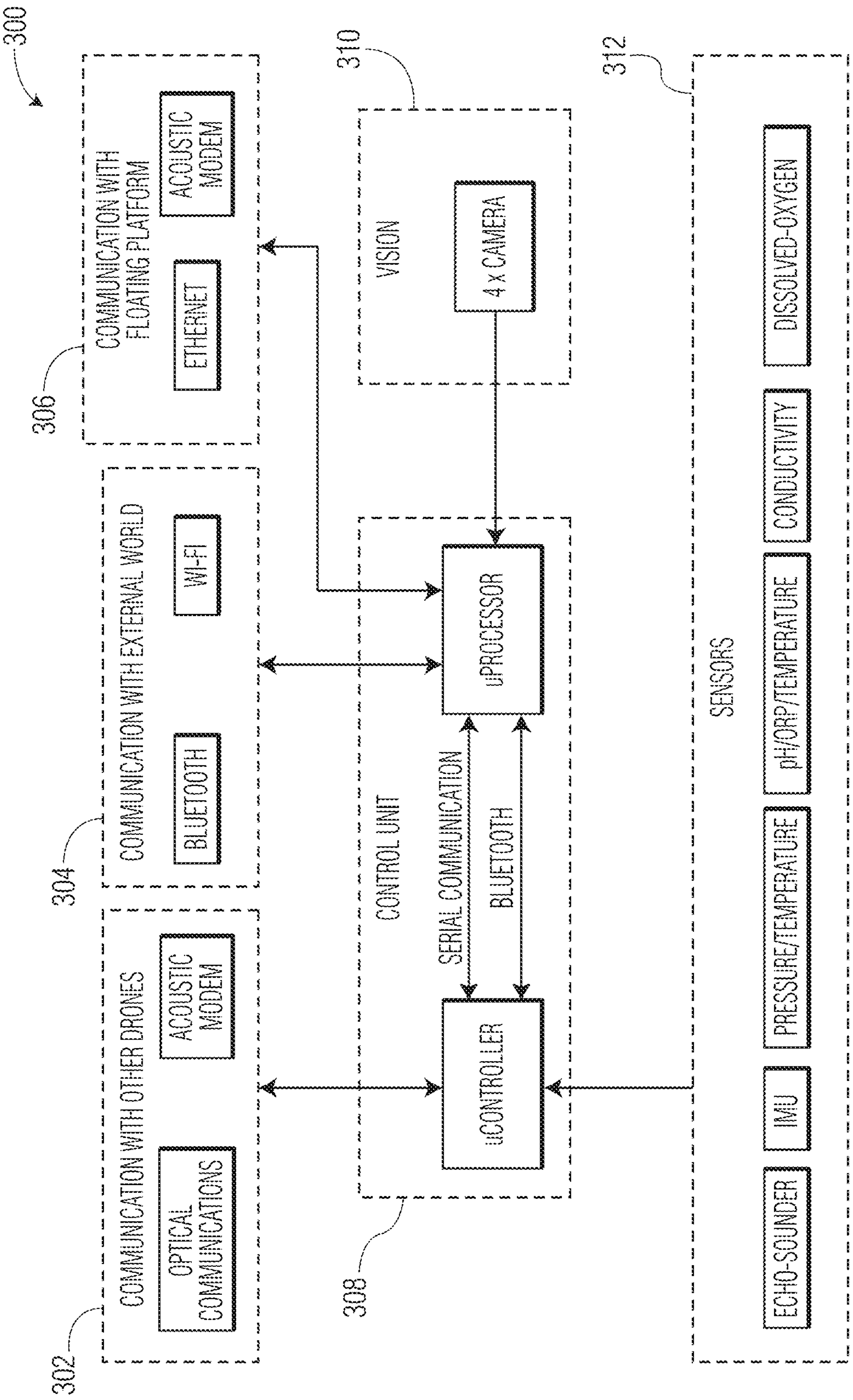
FIG. 3B shows a block diagram of hardware for the sinker, according to an example embodiment of the present disclosure.

FIG. 3B shows a block diagram 300 of the hardware components of the sinker. Included are underwater communication devices 302 for facilitating underwater communications with the drones, above-water communication devices 304 and 306 for facilitating communication with the control station and floating platform, controller 308 for controlling the sinker, camera(s) 310 for capturing underwater images from the point of view of the sinker, various underwater sensors 312 for monitoring position and sea conditions.

Figure 4A:
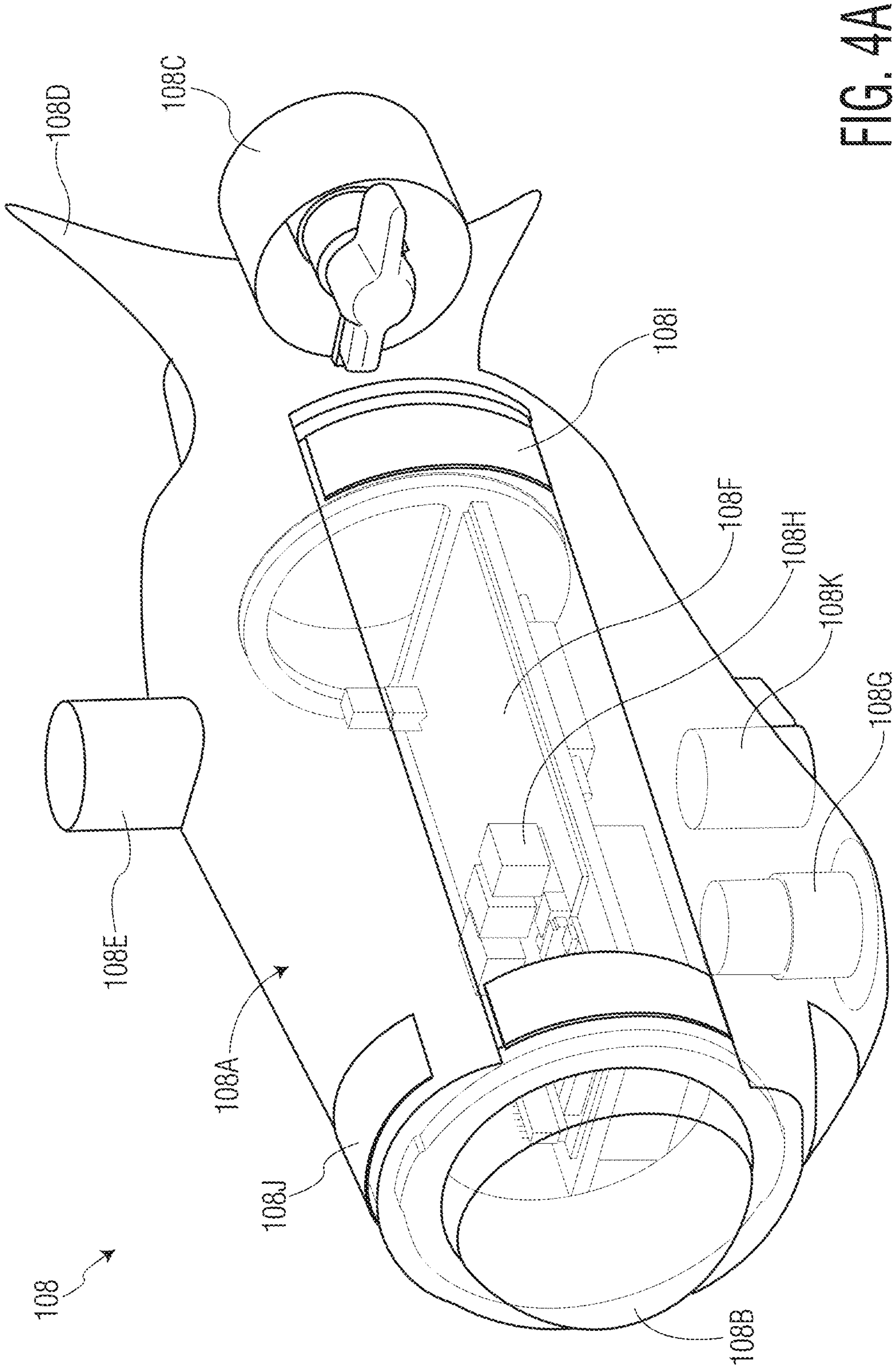
FIG. 4A shows a block diagram of a robotic fish of the system of underwater swarm of robotic fish for monitoring and telepresence, according to an example embodiment of the present disclosure.

As mentioned above, sinker 106 communicates with a swarm of robotic fish that explore the underwater environment. FIG. 4A shows a perspective view of a robotic fish 108 of the system of underwater swarm of robotic fish for monitoring and telepresence. Each robotic fish 108 generally includes electronic components housed in a water-tight body housing that resembles a fish body 108A and tail 108D propelled by one or more thrusters (e.g., electric motor driven propellers) 108C. Of course, other shapes and designs for robotic fish 108 are possible, as the robotic fish 108 does not have to resemble a fish but could be any type of underwater drone. In either case, robotic fish 108 includes front dome 108B (e.g., semispherical lens) having a transmittance that allows images to be captured and optical communications to be supported, electrical circuit board 108F including electrical devices 108H which may include a camera (e.g., aimed in a direction in front of the robotic fish 108 through dome 108B), optical transceiver (e.g., aimed in directions lateral (left/right) to the robotic fish 108), power electronics, control circuits such as a processor, sensors of physical, chemical and biological variables (e.g., pressure sensors, temperature sensors, oxygen sensors, pH sensors, salinity sensors, etc.) transceiver (optical, acoustic, etc.) circuits, and a battery (e.g., lithium-ion battery) for powering the electrical and electronic components of the fish. In addition, robotic fish 108 may include acoustic modem 108E and echosounder 108K. During operation, a controller on circuit board 108F may control the electric motor of posterior and bottom thrusters 108C and 108G and the angular attack of tail 108D to propel the robotic fish 108 through the underwater environment at a desired speed and direction, regulating the depth based on the echosounder 108K, while the robotic fish captures images and other data via the camera and other sensors. Robotic fish 108 may be controlled to communicate other robotic fish in the swarm and with sinker 106 via transceivers in electrical devices 108H. In addition, the robotic fish may include electric sense sensors 1081 and 108J for detecting immediate surroundings of the robotic fish by emitting an electric field and monitoring changes in the electric field due to obstacles. The electric sense plates effectively allow the detection of close objects (e.g., metallic objects) and may be used for collision avoidance together with cameras and other sensors.

Figure 4B:
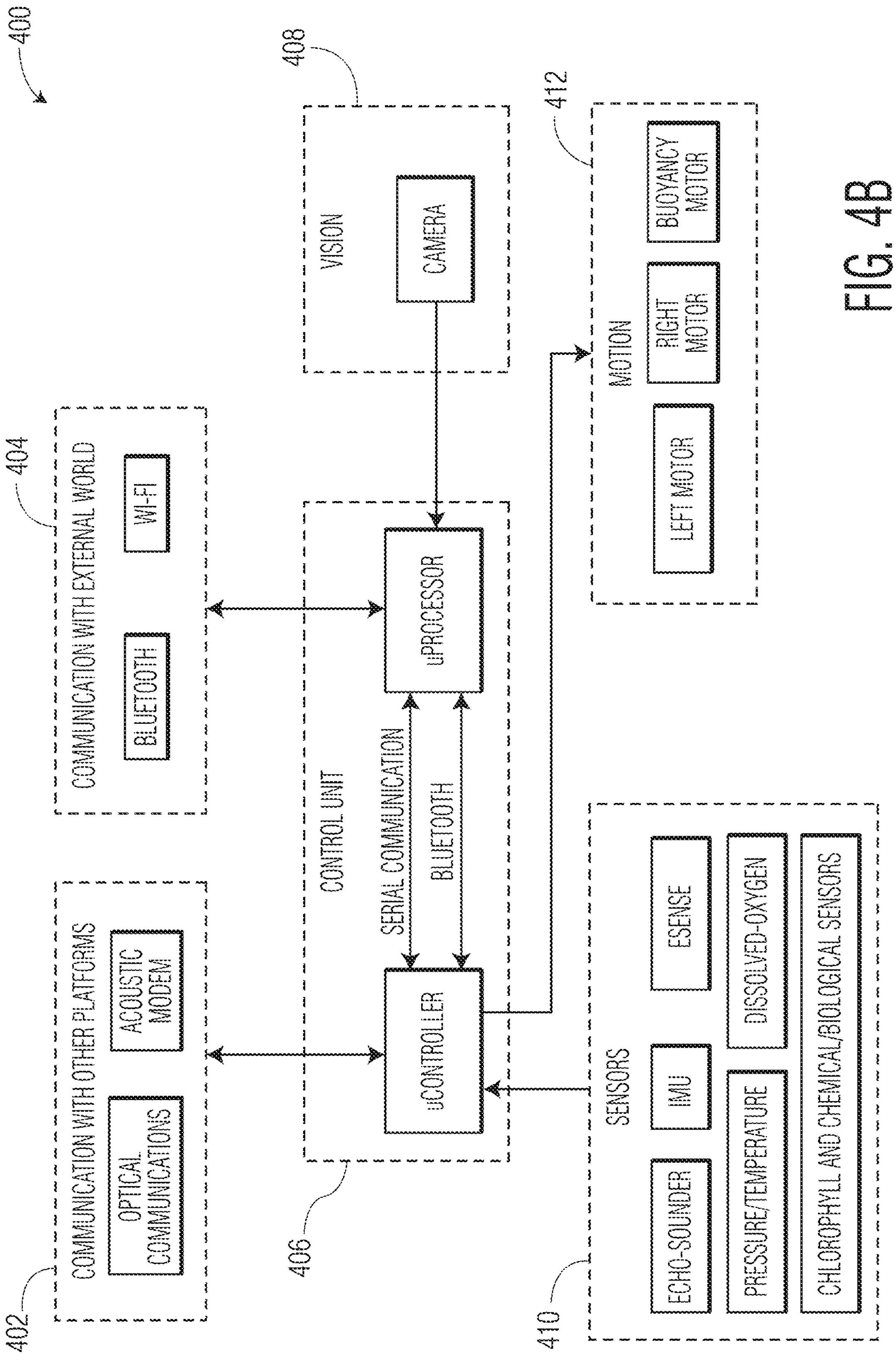
FIG. 4B shows a block diagram of hardware for the robotic fish, according to an example embodiment of the present disclosure.

FIG. 4B shows a block diagram 400 of the hardware components of the robotic fish. Included are underwater communication devices 402 for facilitating underwater communications with the sinker and other drones, above-water communication devices 404 for facilitating communication with the control station, controller 406 for controlling the robotic fish, camera(s) 408 for capturing underwater images, various underwater sensors 410 for monitoring position and sea conditions, and motion devices 412 for propelling the robotic fish.

Figure 5:
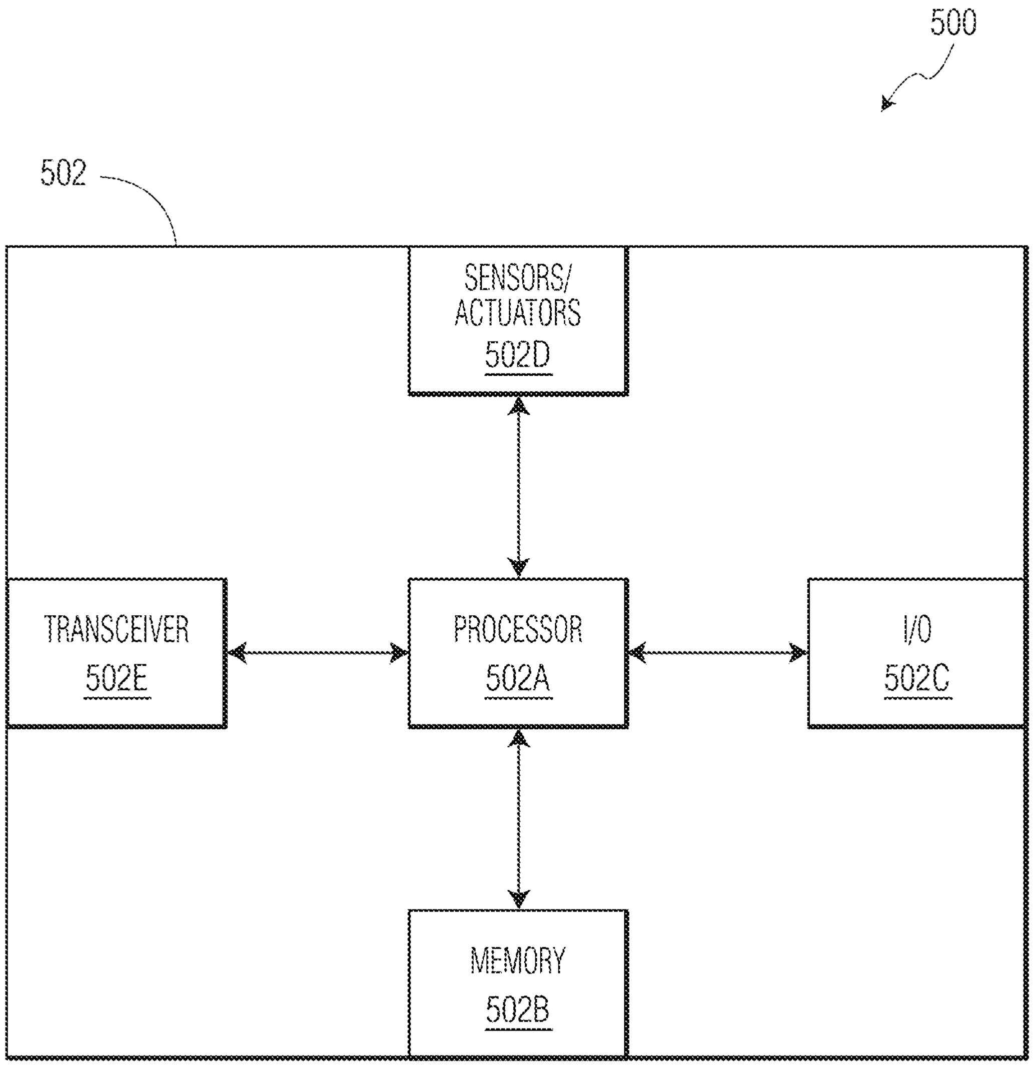
FIG. 5 shows a block diagram of hardware for the devices in the system of underwater swarm of robotic fish for monitoring and telepresence, according to an example embodiment of the present disclosure.

Each of the system devices (e.g., control station 102, floating platform 104, sinker 106 and robotic fish 108) shown in FIGS. 1-4 include various hardware components for supporting their functionality. FIG. 5 shows a block diagram 500 of hardware platform 502 for the system of underwater swarm of robotic fish for monitoring and telepresence. The hardware devices may include but are not limited to processor 502A, memory 502B, input/output (I/O interface) 502C and sensors/actuators 502D. In operation, the processor 502A and memory 502B generally work in conjunction with one another to execute software for controlling operation of the various components of the devices to achieve a desired result. For example, in the context of control station 102, processor 502A may control wireless transceiver 502E to communicate with floating platform 104 in response to operator input (e.g., joystick, buttons, trackball, etc.) for controlling the system received via I/O 502C. In another example, in the context of floating platform 104, processor 502A may control transceiver 502E to facilitate communication between sinker 106 and control station 102, while also controlling sensors/actuators 502D to capture images/data and deploy sinker 106 to a predetermined depth in the underwater environment. In another example, in the context of sinker 106, processor 502A may control transceiver 502E to communicate with floating platform 104 and robotic fish 108, while also controlling sensors 502D to capture images and data. In another example, in the context of robotic fish 108, processor 502A may control transceiver 502E to facilitate communication to/from sinker 106 and other robotic fish 108, while also controlling sensors 502D to capture images and data and controlling actuators 502D to propel and navigate the robotic fish through the underwater environment to achieve an objective.

Figure 6:
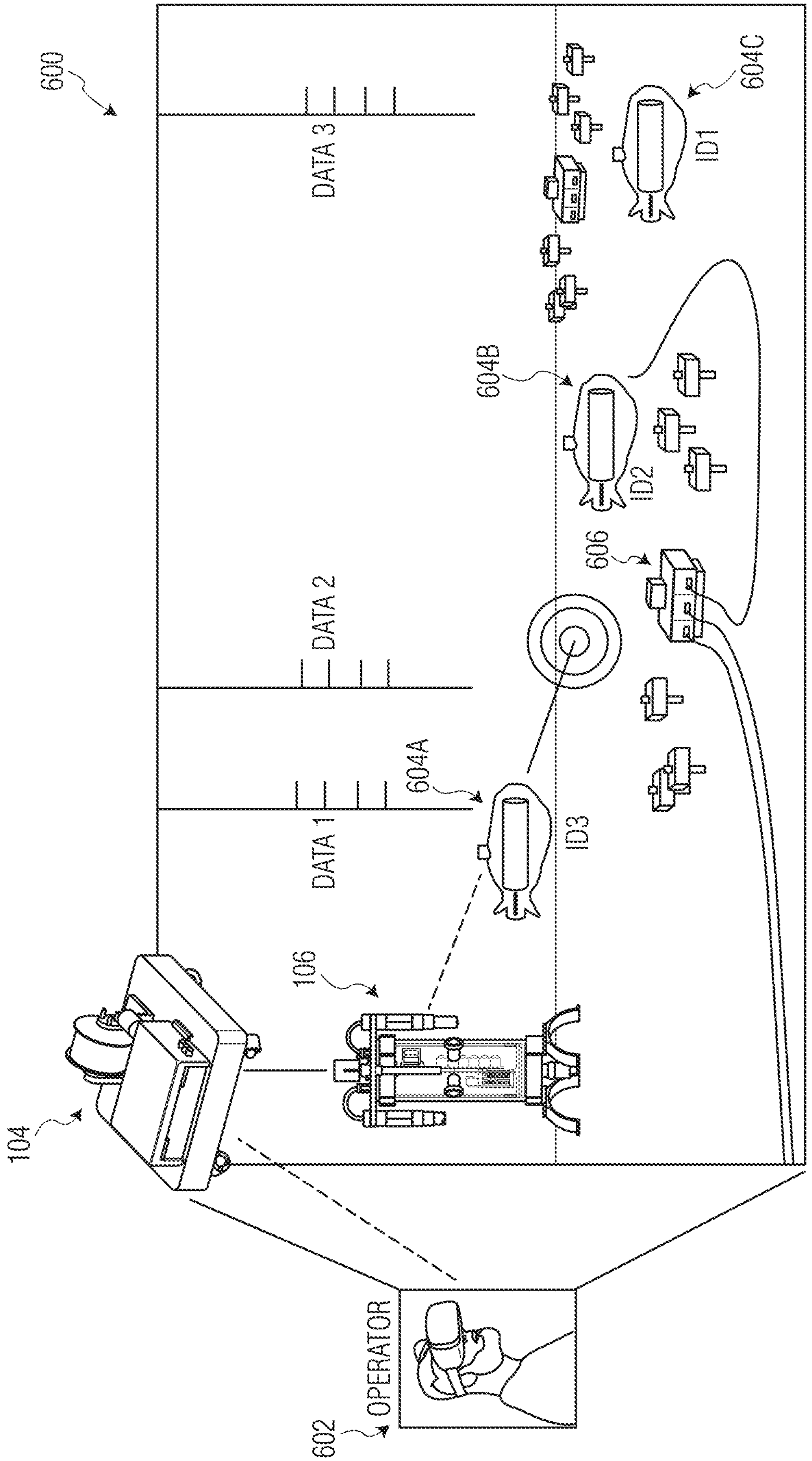
FIG. 6 shows an example view of the system of underwater swarm of robotic fish for monitoring and telepresence, according to an example embodiment of the present disclosure.

As mentioned above, the disclosed system can allow an operator to remotely (e.g., virtually) explore an underwater environment in a manner as if they were a diver (e.g., scuba diver). FIG. 6 shows an example view 600 of a virtual reality (VR) system of underwater swarm of robotic fish for monitoring and telepresence. As shown in FIG. 6, operator 602 may wear a headset (e.g., VR goggles, etc.) for viewing a VR representation of the underwater environment which may include images and sensor data captured by floating platform 104, sinker 106 and a coordinated swarm of robotic fish 604A, 604B and 604C. The VR representation of the underwater environment may include an omnidirectional image environment that allows operator 602 to look in all directions (e.g., left, right, up, down, etc.) to view certain portions (e.g. viewports) of the environment as if the operator were a diver located at the location of sinker 106 or at a location traversed by the robotic fish 604A, 604B and 604C.

For example, as the operator moves VR goggles in free space, the orientation of the VR goggles dictates the portion of the omnidirectional image captured by sinker 106 that is displayed to the operator. In addition to the omnidirectional image captured by sinker 106, the displayed VR environment may include sensor data of physical parameters (e.g., water depth, water pressure, water temperature, distances to objects and measurements of objects), chemical parameters (e.g. pollutant concentrations) and biological parameters (e.g., chlorophyll or organic matter concentrations) captured by robotic fish 604A, 604B and 604C as they explore the underwater environment. This data can be superimposed directly over the displayed image. The operator may also have a control device (e.g., joystick, buttons, etc.) that allows the operator to control what is being displayed. For example, the operator may be able to control the system to switch from displaying the image from sinker 106 to displaying images captured by one or more of the robotic fish 604A, 604B and 604C. The images captured by the fish may be images from a single fish or images stitched together from multiple fish. In other words, the operator can supplement their view or change perspectives of their view in the underwater environment. Viewing images captured by the fish may be useful for more closely inspecting underwater objects that may be too far away from sinker 106 but can be more closely inspected by robotic fish 604A, 604B and 604C. In addition, the operator may be able to manually control robotic fish 604A, 604B and 604C to navigate to a particular location in the underwater environment. In other words, operator 602 may view images captured by robotic fish 604A, 604B and 604C as they are operating in autonomous mode according to a mission, or in a manual mode controlled directly by the operator.

In the autonomous mode, the mission may be to map a 360° view of an underwater structure 606. The mission parameters and goals may be pushed from control station 102 to robotic fish 604A, 604B and 604C via floating platform 104 and sinker 106. Upon receiving the mission parameters and goals, robotic fish 604A, 604B and 604C coordinate with one another and begin executing the mission. Executing the mission may include agreement on roles for each of the fish. For example, robotic fish 604A, 604B and 604C may each have directives to capture images and data from different portions (e.g., different sides) of the underwater structure. Once agglomerated, the various images and data points may be used to support the VR experience of the operator, thereby allowing the operator to view all aspects and important data measurements related to the underwater structure.

Figure 7:
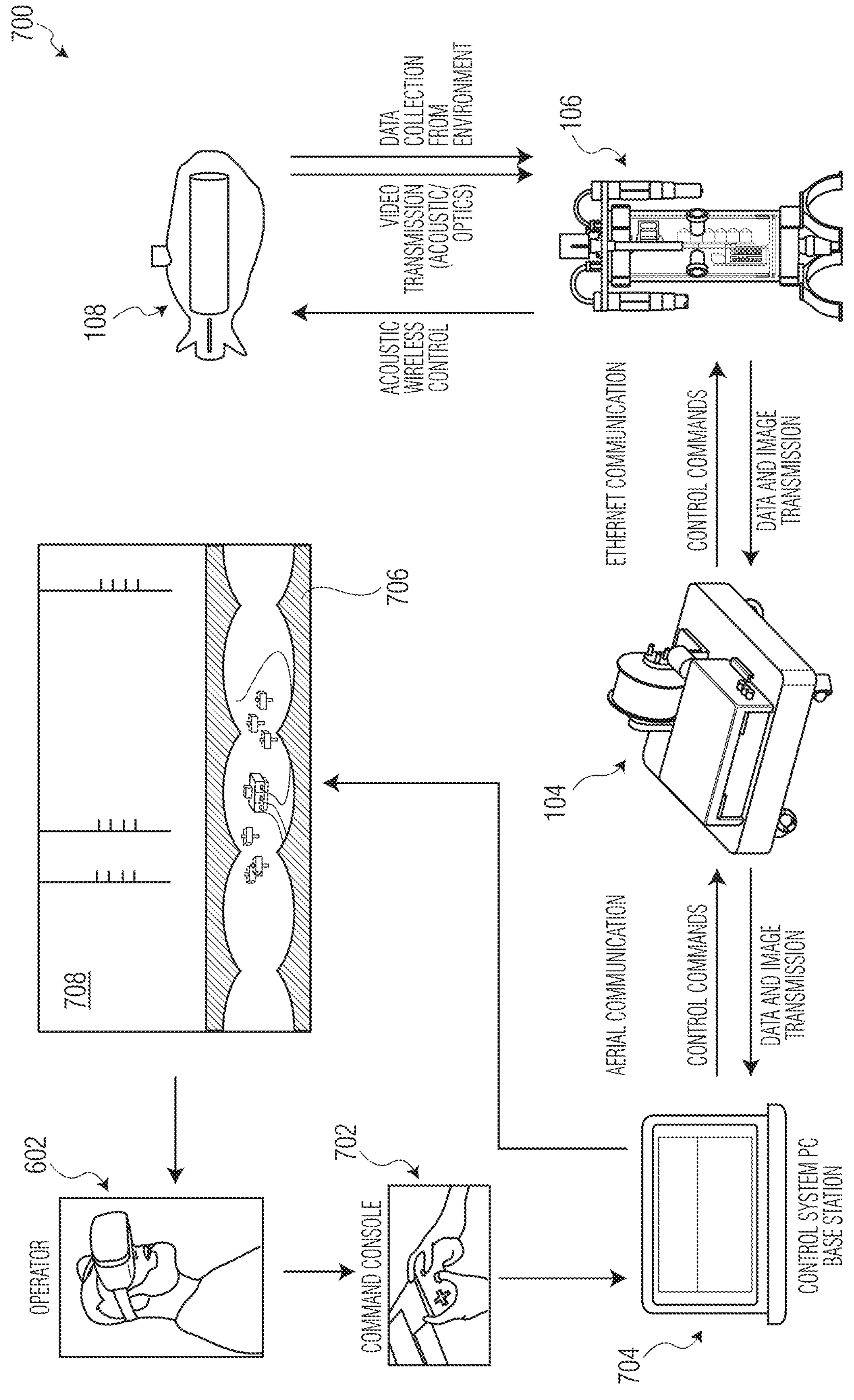
FIG. 7 shows an example communication flow of the system of underwater swarm of robotic fish for monitoring and telepresence, according to an example embodiment of the present disclosure.

Communication between the system devices can be flexible. FIG. 7 shows an example communication flow 700 of the system of underwater swarm of robotic fish for monitoring and telepresence. As mentioned above, a VR environment is displayed to operator 602 via VR goggles. This VR environment may include a 360° view 706 of the underwater environment from the perspective of sinker 106 or from the perspective of one or more robotic fish 108, as well as sensor data 708 augmented over the displayed images. Operator 602 may utilize command console 702 and base station computer 704 to control the overall system operation. For example, control commands may be sent from base station computer 704 to platform 104. These control commands can then be relayed to sinker 106 and robotic fish 108. Images and data captured/computed by sinker 106 and robotic fish 108 are then relayed back through the communication channels to base station computer 704 and then displayed to the operator via the VR goggles. The communication channel between base station computer 704 and floating platform 104 may be a wireless connection (e.g., Wi-Fi), while the communication channels between floating platform 104 and sinker 106 may be a wired connection (e.g., ethernet cable), and the communication channel between sinker 106 and robotic fish 108 may be acoustic channels, optical channels or a combination of both.

Figure 8:
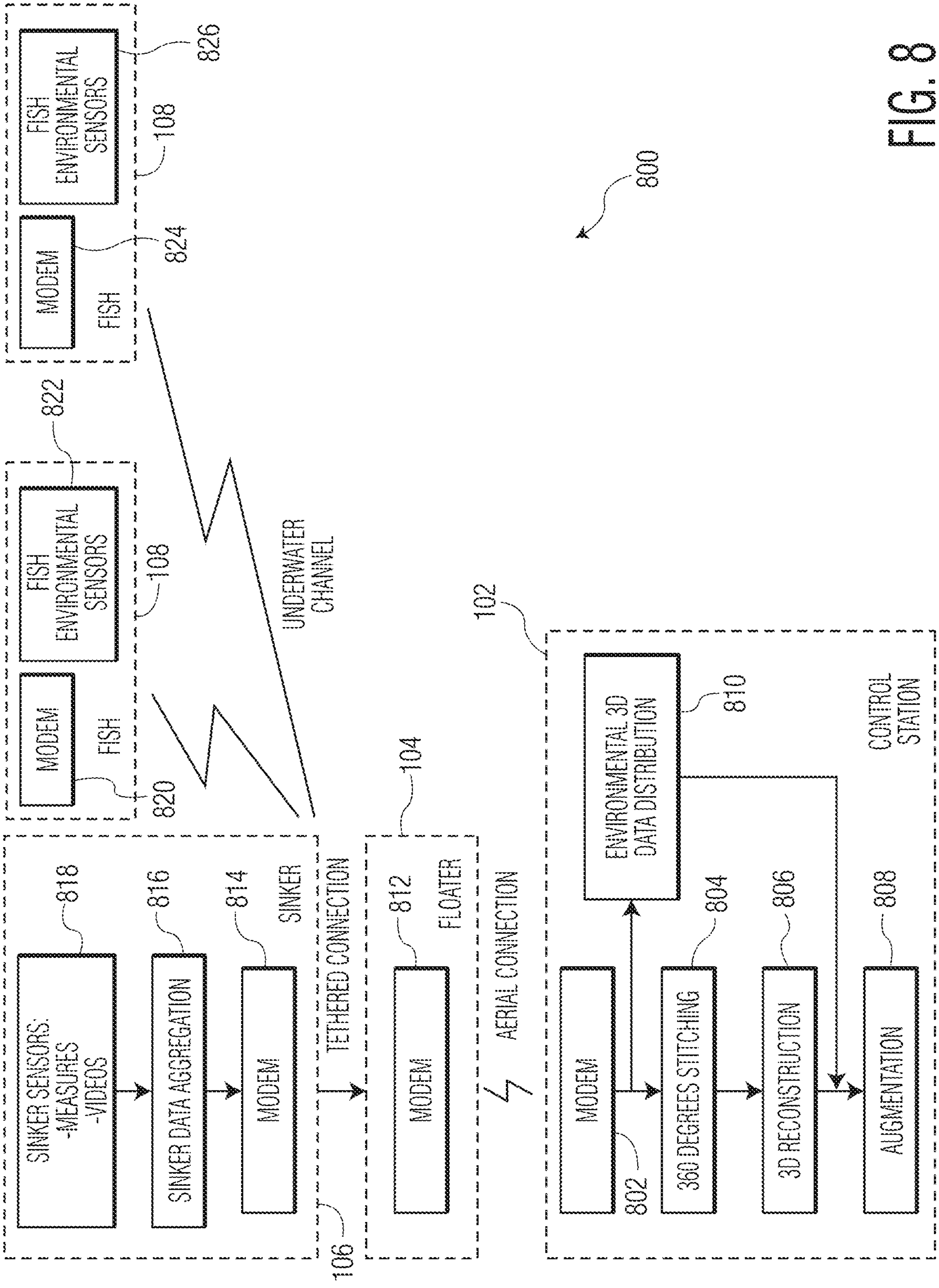
FIG. 8 shows a block diagram of the system of underwater swarm of robotic fish for monitoring and telepresence, according to an example embodiment of the present disclosure.

FIG. 8 shows a block diagram 800 showing hardware and functional details of the system of underwater swarm of robotic fish for monitoring and telepresence. In FIG. 8, control station 102, floating platform 104, sinker 106 and robotic fish 108 all include respective modems 802, 812, 814, 820 and 824 respectively for facilitating communication between the devices. The modems for the floating platform and control station may support wireless communication for above-water communication, while the modems for the floating platform, sinker and robotic fish may support both acoustic communication and optical communication for underwater communication via, for example, underwater channel 830. During operation, cameras/sensors 822 and 826 of robotic fish 108 capture images and/or data of the underwater environment and transmit the captured images/data to modem 814 of sinker 106 using modems 820/824 via underwater channel 830. Sinker 106 may perform data aggregation 816 which combines the images/data received from robotic fish 108 with images/data 818 captured by sinker 106. This aggregated data is then transmitted from modem 814 to modem 812 of floating platform 104. As previously noted, the communication between modems 812, 814, 820 and 824 may be acoustic or optical. Floating platform 104 then transmits the aggregated data from modem 812 to modem 802 of control station 102. Once received, control station 102 performs processing such as stitching 804 and 3D panoramic reconstruction 806 to create a VR 360° environment for display to the operator along with environmental data distribution 810 which is augmented at block 808 over the displayed image. Of course, communication may travel in the opposite direction. For example, the modems may be used to send instructions/data in the opposite direction (e.g., from control station 102 to floating platform 104, sinker 106 and robotic fish 108).

Figure 9:
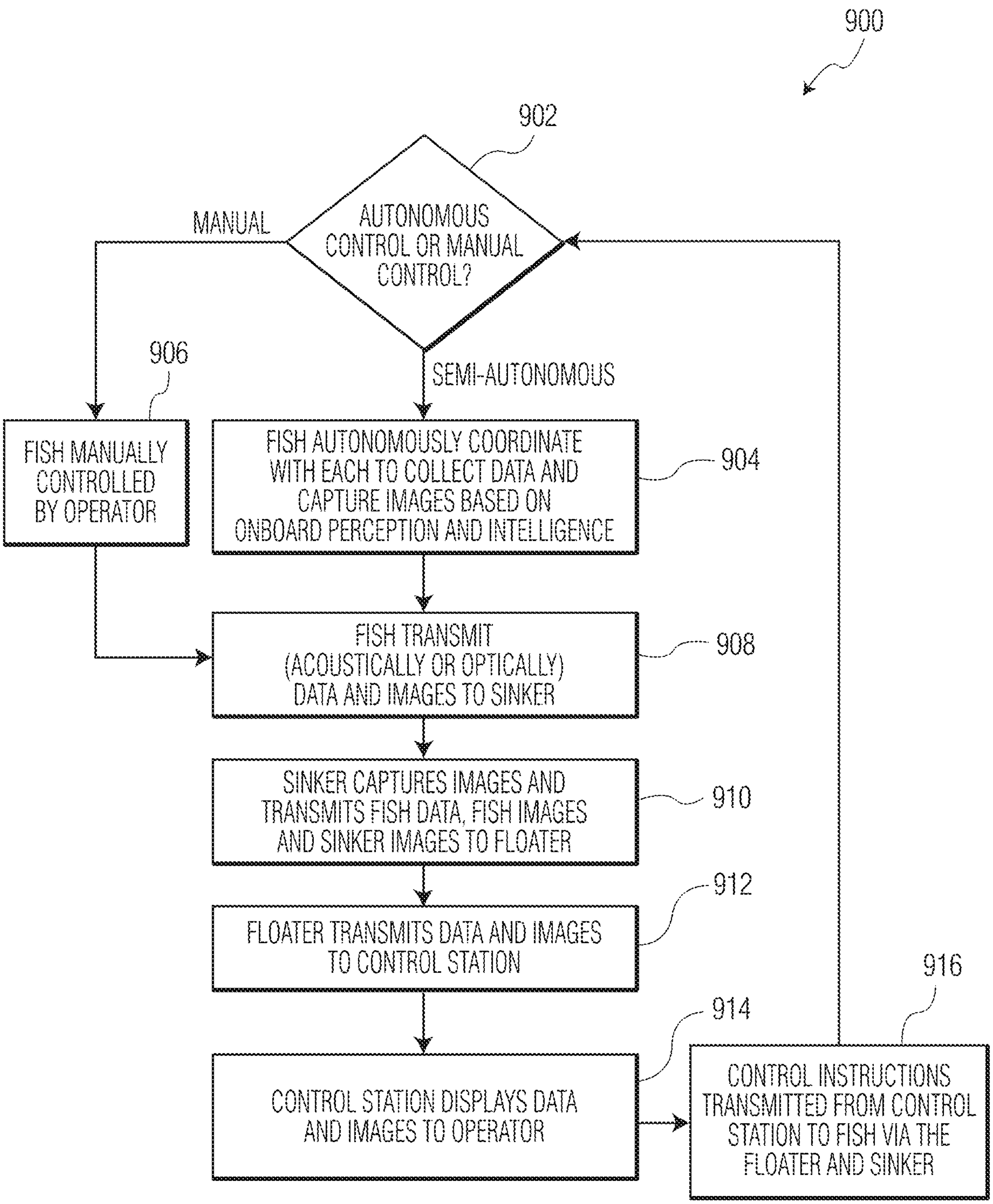
FIG. 9 shows a flowchart of the operation of the system of underwater swarm of robotic fish for monitoring and telepresence, according to an example embodiment of the present disclosure.

FIG. 9 shows a flowchart 900 of the operation of the system of underwater swarm of robotic fish for monitoring and telepresence. In step 902, the system enters either an autonomous control mode or a manual control mode or a semi-autonomous mode. The control mode may be automatically set by the system or manually selected by the operator. In the manual control mode, the operator is able to manually control the fish in step 906. In other words, in manual modem the operator can control the navigation and data collection of a selected fish. This may allow the operator to view an image/video and sensor data captured by a selected fish as it is manually navigated through the underwater environment. In the autonomous control mode, robotic fish 108 autonomously navigate and coordinate with one another to collect data and capture images based on mission instructions from the control station in step 904. Either scenario, robotic fish 108 optically or acoustically transmit their data/images to sinker 106 in step 908. Sinker 106 may also capture data/images and transmit the data/images captured by the sinker 106 and the robotic fish 108 to the floating platform 104 in step 910. This transmission may be made via the wired connection between floating platform 104 and sinker 106. In step 912, floating platform 104 then transmits the data/images to control station 102. In step 914, control station 102 displays the data/images to the operator via, for example, the VR goggles. Control station 102 may then send further instructions to the sinker and robotic fish in step 916. These instructions may be automatically generated by control station 102 or may be based in part on input received from the operator. In either scenario, control station 102 is able to control operation of sinker 106 and robotic fish 108 to capture desired data/images in the underwater environment.

Figure 10:
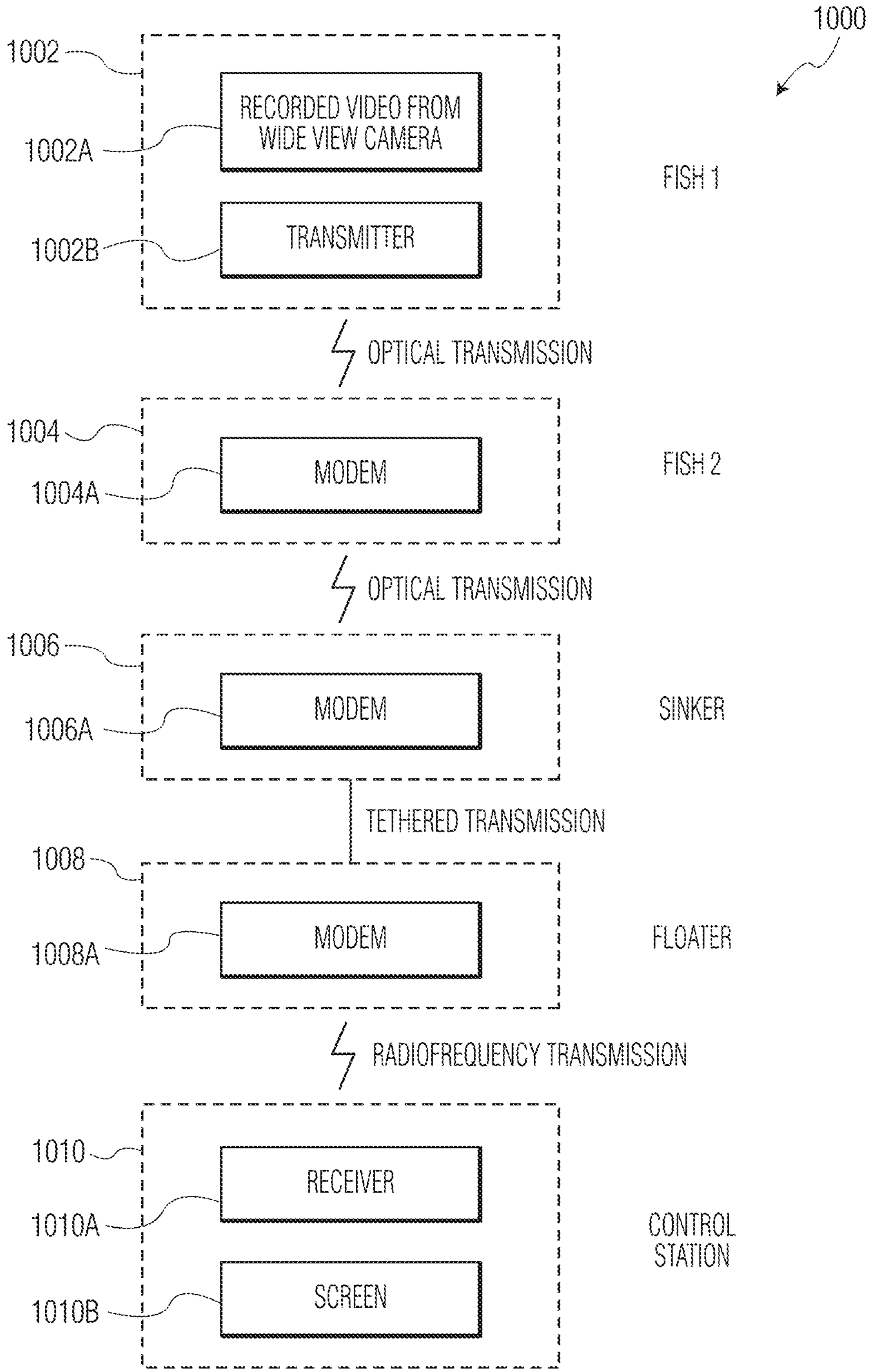
FIG. 10 shows a block diagram of the optical chain operation of the system of underwater swarm of robotic fish for monitoring and telepresence, according to an example embodiment of the present disclosure.

Transmission of data, especially large data such as images may exceed the realistic bandwidth of the acoustic channel. In other words, the limited bandwidth of the acoustic channel may result in unacceptable transmission times for large data such as the captured images. Therefore, in some scenarios, the higher bandwidth optical transmission channel may be desirable. FIG. 10 shows a block diagram 1000 of an optical chain operation of the system of underwater swarm of robotic fish for monitoring and telepresence. In order to perform optical communication, the transmitter and receiver are in line-of-sight of one another. Thus, the robotic fish 108 may align itself with the sinker to perform line-of-sight transmissions. However, the chemical composition of the water in underwater environments (e.g., murkiness) may limit the distance that light can be transmitted and received at an acceptable intensity level for proper operation of optical communication transceiver. In order to facilitate dependable optical communication even in murky environments, the multiple robotic fish 108 form a "optical chain" where the fish align with one another at predetermined distances to transmit data from one fish at the end of the chain to the sinker at the other end of the chain of the chain. Alignment of robotic fish 108 may be performed by acoustic ranging between neighboring fish, visual servoing of images of neighboring fish and the like. For example, as shown in FIG. 10, fish 1002 may be located too far away from sinker 1006 to directly communicate via the optical channel. In order to facilitate optical communication, fish 1004 may coordinate with fish 1002 to act as an intermediary to relay the optical communication to sinker 1006. For example, fish 1004 may position itself halfway between fish 1002 and sinker 1006 thereby cutting the optical transmission distance in half. During operation, fish 1002 may record images/video 1002A and utilize optical transmitter 1002B to transmit the captured images/video to modem 1004A of robotic fish 1004. Robotic fish 1004 then optically relays the captured images/video to modem 1006A of sinker 1006 which in turn relays (via the wired connection) the captured images/video to modem 1008A of floating platform 1008. The captured images/video may then be relayed via wireless communication to receiver 1010A and displayed on screen 1010B of control station 1010. In other words, the captured images/video may be relayed optically between two or more robotic fish to sinker 1006 and then relayed as usual to the floating platform and control station. The number of fish required to form the optical chain may be dependent on numerous factors including but not limited to the optical properties of the water, distance from the capturing robotic fish to the sinker, and optical capabilities of the optical transceivers of the fish and sinker.

In the optical chain example described above, once the robotic fish 108 align with the sinker, robotic fish 108 align with the sinker may maintain their position in the water until communication is complete. In another example, one or more of the robotic fish 108 may move to facilitate optical transmission. For example, if the distance between fish 1002 and sinker 1006 in FIG. 10 is too great for fish 1004 to bridge the gap between the two, fish 1004 may first align itself in close proximity to fish 1002 to receive and store the transmission of the captured images. Fish 1004 may then maneuver itself closer to sinker 1006 and begin relaying the stored images to the sinker. In other words, the optical chain may be a static link where the fish do not move once aligned, or may be a dynamic link where one or more of the fish move to help facilitate relaying of the captured images to the sinker.

Figure 11:
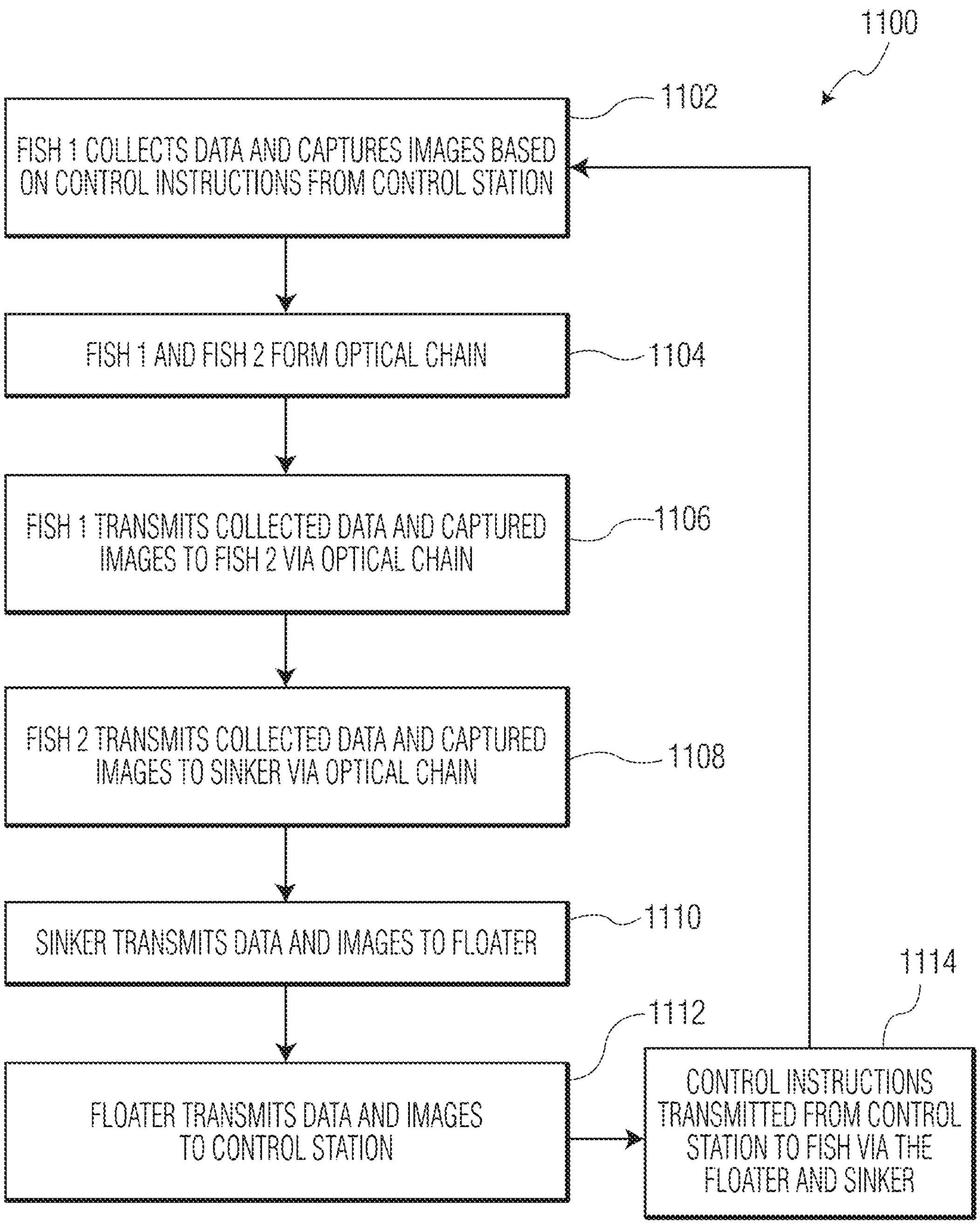
FIG. 11 shows a flowchart of the optical chain operation of the system of underwater swarm of robotic fish for monitoring and telepresence, according to an example embodiment of the present disclosure.

FIG. 11 shows a flowchart 1100 of the optical chain operation of the system of underwater swarm of robotic fish for monitoring and telepresence. In step 1102, fish 1 collects data and captures images based on control instructions received from control station 102. As mentioned before, these control instructions may be mission instructions for autonomously exploring the underwater environment, or instructions for manual control of the fish by the operator. In either scenario, once the images are captured, fish 1 (i.e., first robotic fish in the swarm) and fish 2 (i.e., second robotic fish in the swarm) may form an optical chain in step 1104. Of course, more than two fish may form the optical chain. Formation of the optical chain may be requested by fish 1 or intelligently determined by fish 2. For example, fish 1 may determine that it is too far from the sinker to perform optical communication and request fish 2 to position itself as part of the optical chain. In another example, fish 2 may determine that fish 1 is too far from the sinker to perform optical communication and therefore automatically position itself as part of the optical chain. In either case, in step 1106, fish 1 then transmits the captured images to fish 2 via the optical chain. In step 1108 fish 2 transmits the captured images to the sinker via the optical chain. Transmission from fish 2 to the sinker may or may not require fish 2 to move closer to sinker 106 when relaying the data. Sinker 106 then transmits the captured images to floating platform 104 via the tethered wired connection in step 1110, which then in step 1114 transmits the captured images in step 1112 to the control station 102. As mentioned above, control station 102 transmits instructions to fish 1 and fish 2 via the floating platform 104 and sinker 106. Sinker 106 may communicate these instructions via the optical chain or via the acoustic channel.

Figure 12:
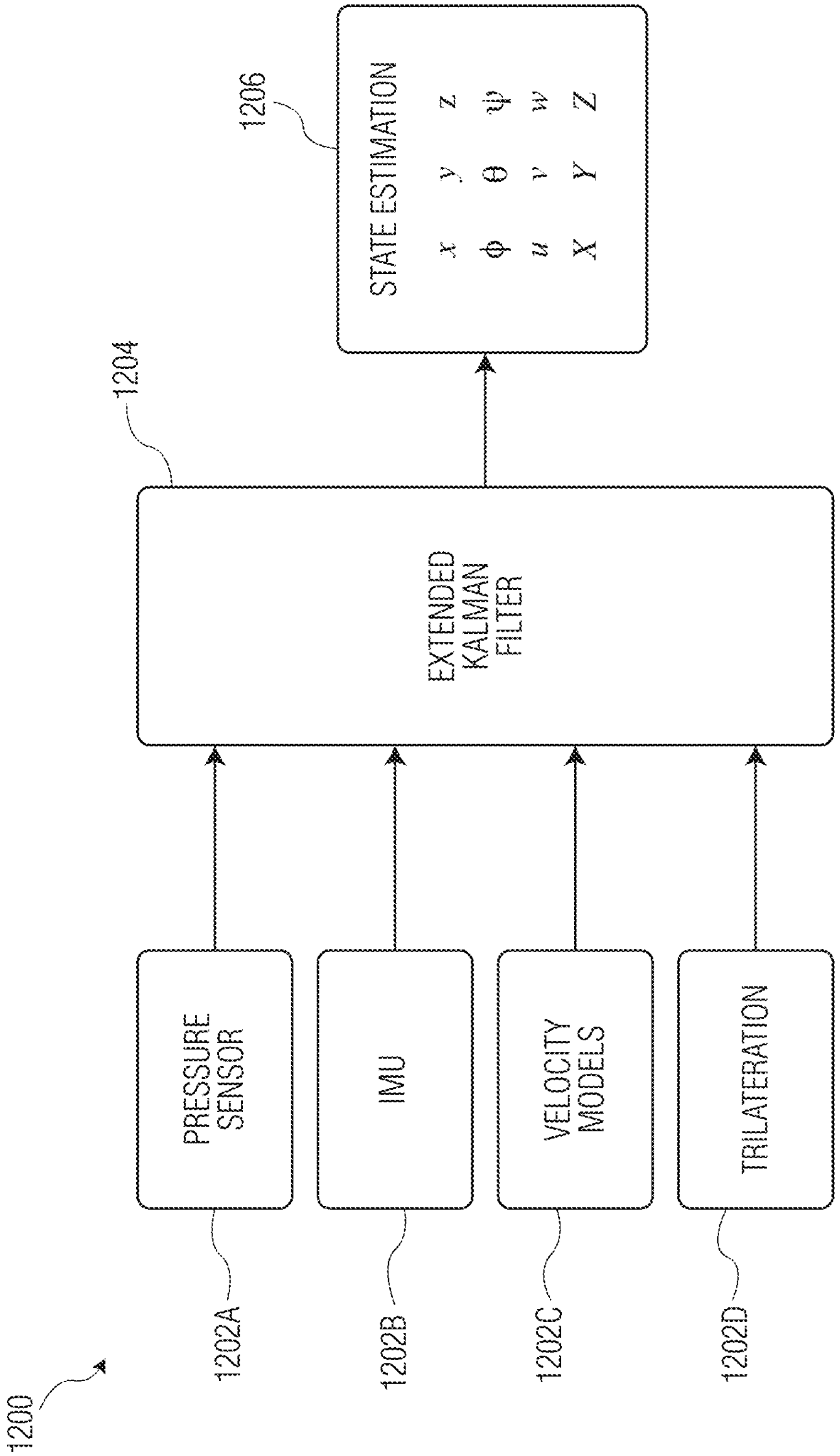
FIG. 12 shows a block diagram of a fusion algorithm for the system of underwater swarm of robotic fish for monitoring and telepresence, according to an example embodiment of the present disclosure.

FIG. 12 shows a block diagram 1200 of a fusion algorithm for the localization of the system of underwater swarm of robotic fish for monitoring and telepresence. The disclosed swarm configuration presents opportunities for collaborative localization methods, primarily relying on relative localization between the robotic fish. An initial step involves estimating each agent's (each robotic fish's) own state. This estimation relies on the onboard sensors. For example, pressure measurements from pressure sensors on the robotic fish can accurately predict depth, thereby restricting the localization problem to the horizontal plane. In addition, Inertial Measurement Units (IMU) and magnetometers present in the robotic fish may provide information about the pose and heading of the robotic fish. Integrating acceleration data can be used to derive velocity and position information. However, IMU readings suffer from rapid accumulation of bias and therefore benefit from fusion with other sensor data. To address this challenge, a velocity estimator 1202C capable of predicting horizontal velocity has been developed. By considering the force vector output by the velocity model and leveraging knowledge of the agent's hydrodynamic characteristics as well as information from other sensors, the fusion algorithm calculates the limit velocity and direction of the vehicle. Incorporating the acceleration data allows the system to estimate velocity components by inverse modeling. The fusion algorithm may be embodied by an Extended Kalman Filter (EKF) 1204 that returns estimated states (e.g., position, orientation, linear and angular velocity and acceleration, etc.) of the robotic fish in the underwater environment based on observations collected from sensors which may include pressure data from fish pressure sensor 1202A, dead reckoning data from fish internal measurement unit (IMU) 1202B, and estimated values like velocity data from velocity models 1202C and locations of the fish computed by constellation, including an optimization of reciprocal trilateration 1202D for each robotic fish conditioned to their absolute positions. The EKF steps may include initializing the estimated states, predictions, and updates. The predictions may include predicting the next state estimate 1206 using a transition function, predicting error covariance associated with the estimated state. The updates may include predicting the measurement for the next state, computing Kalman gain, correcting the predicted state, correcting the predicted covariance. These steps are generally repeated as new measurements are captured. It is noted that algorithms other than EKF (e.g., other types of Kalman filters, particle filters, neural networks, etc.) may be used to estimate states of the robotic fish in the underwater environment based on information collected from sensors and data computations. The estimated states of the robotic fish may be shared between the robotic fish in the swarm to coordinate efforts in collecting data from the underwater environment in an efficient and safe manner. In other words, the robotic fish can collaboratively compute their locations in a more accurate manner based on data received from one another. In one example, global positioning and orientation of the devices can be achieved by means of bathymetry provided by the devices or geomagnetic field anomalies measured by each device. This results in the realization of a collective wide aperture scanner.

As mentioned above, the acoustic communication channel may be bandwidth challenged which could result in long transfer times for large format data such as captured images.

For example, small acoustic modems (suitable for the school of robotic fish) may have a bandwidth of around 64 B/s through the dedicated channel. Considering even modestly sized images of size 640×480 with 8-bits of color/grayscale depth, this implies that an image will take too long to be transmitted thereby resulting in a poor user experience. Lossy compression may be acceptable to a degree, so the present system solves this bandwidth problem by implementing a deep convolutional autoencoder (CAE) for underwater image compression. An example autoencoder encodes initial images in 600B coded images to be transmitted and decoded at the receiver. The final dimension of 600B, for example, allows the transmission of an image in around 10 seconds with the acoustic modem.

Figure 13:
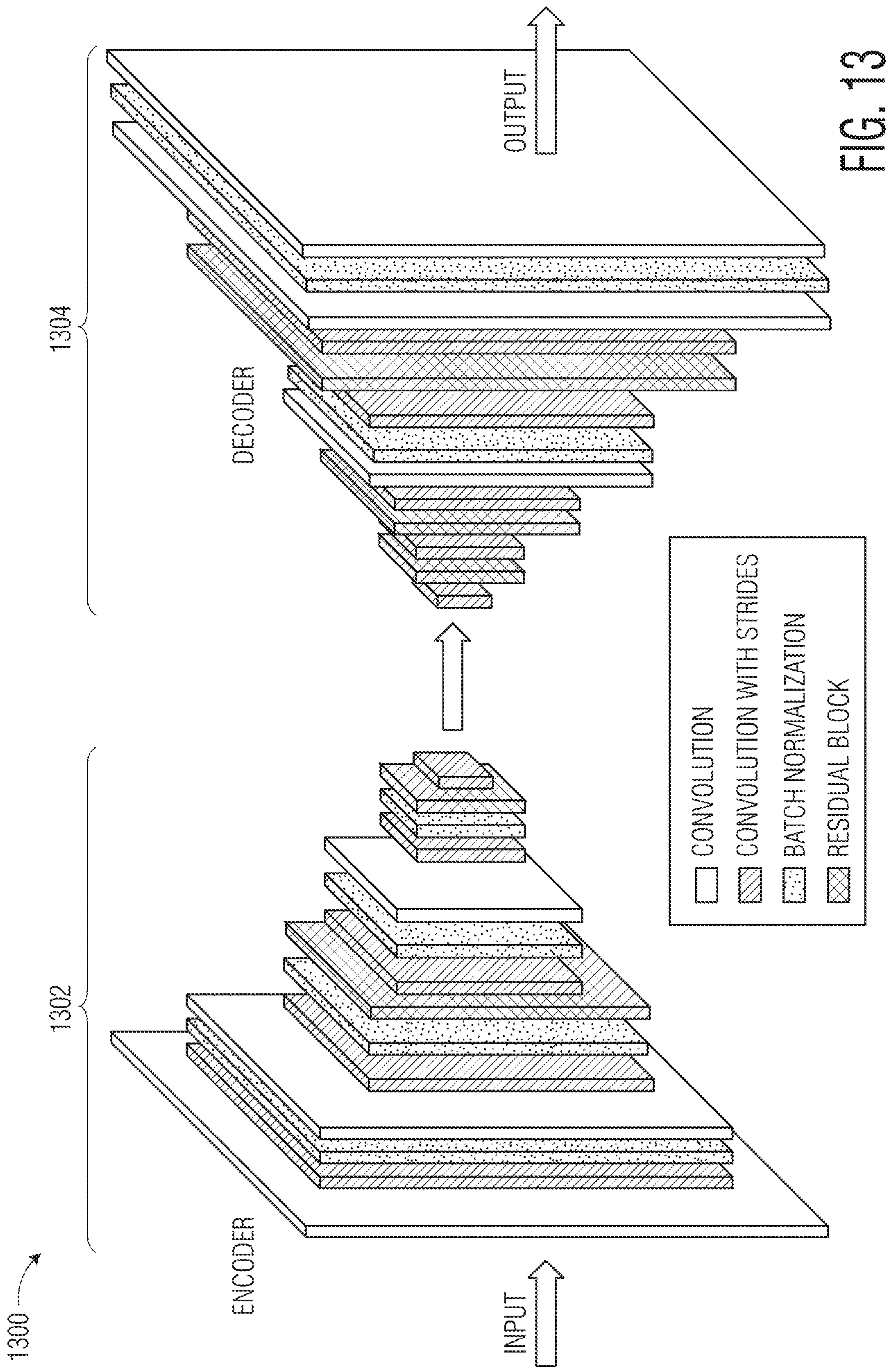
FIG. 13 shows a flow of an encoder/decoder for acoustic communication for the system of underwater swarm of robotic fish for monitoring and telepresence, according to an example embodiment of the present disclosure.

Thus, in order to reduce the size of acoustic data transmissions, the present system performs autoencoding of the data prior to transmission. FIG. 13 shows a flow 1300 of an encoder/decoder for acoustic communication for the system of underwater swarm of robotic fish for monitoring and telepresence. As shown in FIG. 13, the encoder 1302 and decoder 1304 both include multiple convolutional layers to encode the larger image as a reduced size image prior to transmission and decode the reduced size image to the larger image upon reception. For example, encoder 1302 (e.g., executing on fish 108) passes the captured larger image through multiple convolutional layers that extracts certain important features from the image. For example, the convolutional layers use a filter that is convolved across the image to produce a resultant feature map of important features. The extracted features are then down-sampled to reduce the size of the image. This process may be repeated several times until an image of a desired size is achieved. This resultant compressed image is then transmitted by fish 108 over the acoustic channel and received by the sinker. The sinker then performs decoder 1304 operations by performing the reverse operations of encoder 1302. For example, decoder 1304 may repeatedly apply transposed convolutional layers with Strides to sequentially enlarge the image to the original size for display to the operator.

Figure 14:
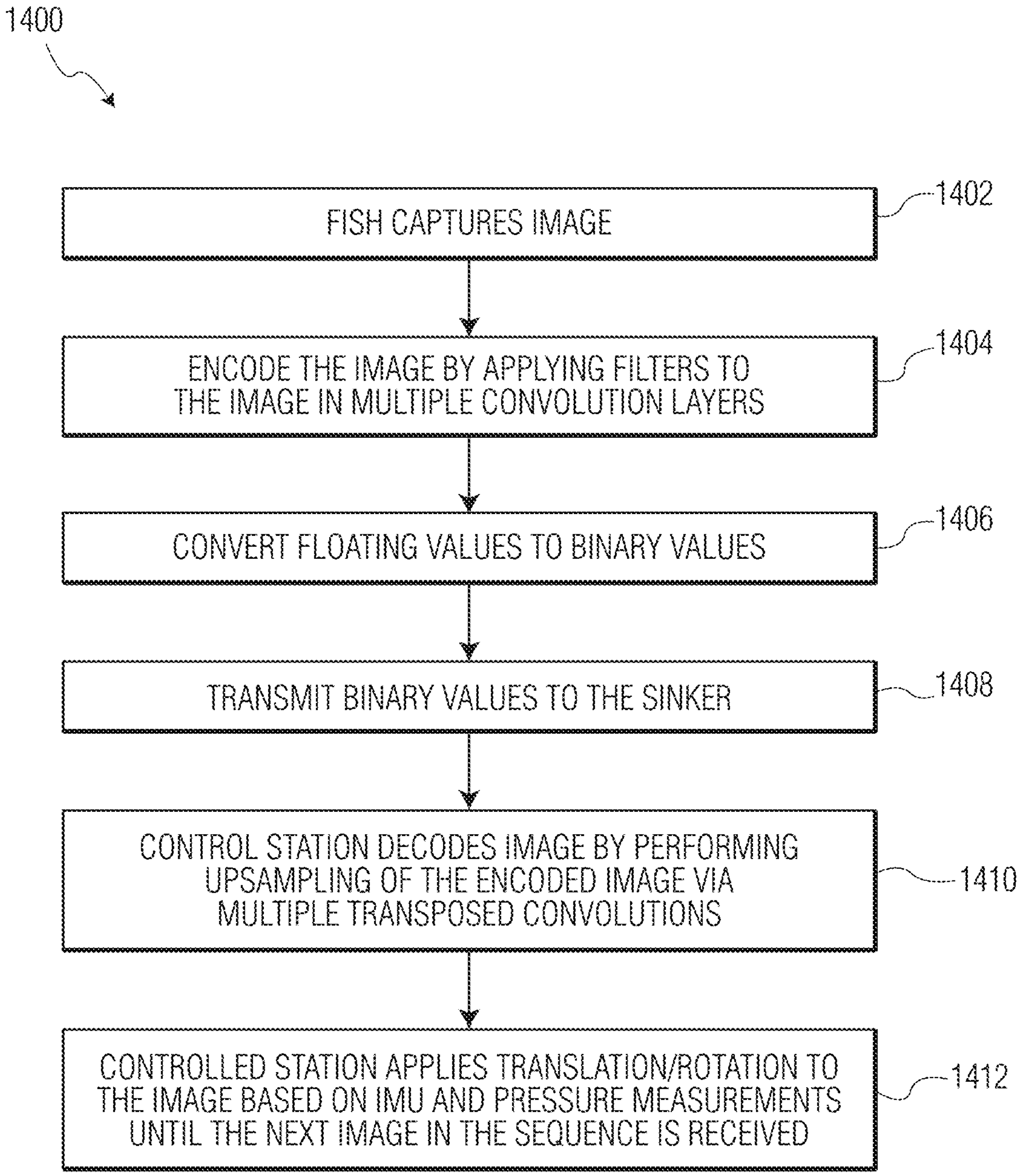
FIG. 14 shows a flowchart of the operation of the encoder/decoder for acoustic communication for the system of underwater swarm of robotic fish for monitoring and telepresence, according to an example embodiment of the present disclosure.

FIG. 14 shows a flowchart 1400 of the operation of the encoder/decoder for acoustic communication for the system of underwater swarm of robotic fish for monitoring and telepresence. The aim is to develop a light model allowing partially lossy compression. In step 1402, fish 108 captures an image. In step 1404, fish 108 encodes the image passing through a series of convolutional layers, convolutional layers with strides, batch normalization layers with the addition of residual blocks. A Leaky Relu activation function may be used at each layer except for the first layer where a hyperbolic tangent function is applied and the last layer where a sigmoidal function is applied. The light model is designed to run on the edge of the fish 108 equipped with a fairly low powered processing system (e.g., Raspberry Pi or Jetson). This is achieved in part because the autoencoder is characterized by few kernels. The autoencoder may include a limited number (e.g., 40,000) parameters which makes this autoencoder very light to be run on the edge with short inference times. This is different from conventional autoencoders that require around 1,000,000 parameters to function. In addition, the compression rate achieved is higher or comparable to existing systems. The lightness of the model due to the relatively small number of parameters, achieves the advantage by use of the low number of kernels being used. The trade-off between a lower number of detected features with enough resolution allows the underwater scene comprehension and telecontrol to be understood by a human operator. The solution is effectively a lossy compression paradigm that guarantees short inference time on the edge with enough accuracy for operative purpose. In step 1406, fish 108 then converts the resultant compressed floating values to binary values which are then transmitted to sinker 106 in step 1408 and relayed to the control station which decodes the image in step 1410 using multiple transposed convolutions that reverse the encoding processing. It is noted that decoding may be performed by the control station or may be performed by the sinker or floating platform. In other words, once the data has traversed the acoustic channel, decoding may be performed at any stage in the process of relaying the image to the control station. At the control station, between the sequential transmissions of images (e.g., a first image followed by a second image), in step 1412, a translation/rotation may be applied to the first image, based on the measurements from the IMU and pressure sensors. This translation/rotation of the first image may be transmitted at higher frequency in the time interval between the first and the second image. This allows the operator to have an updated realistic view of the captured scene during the blind time interval before the second image is received. As soon as the second image is received, the screen is refreshed to display the second image. This technique helps cope with delays resulting from the acoustic communications, thereby allowing the operator to take action even before additional images are received.

Figure 15:
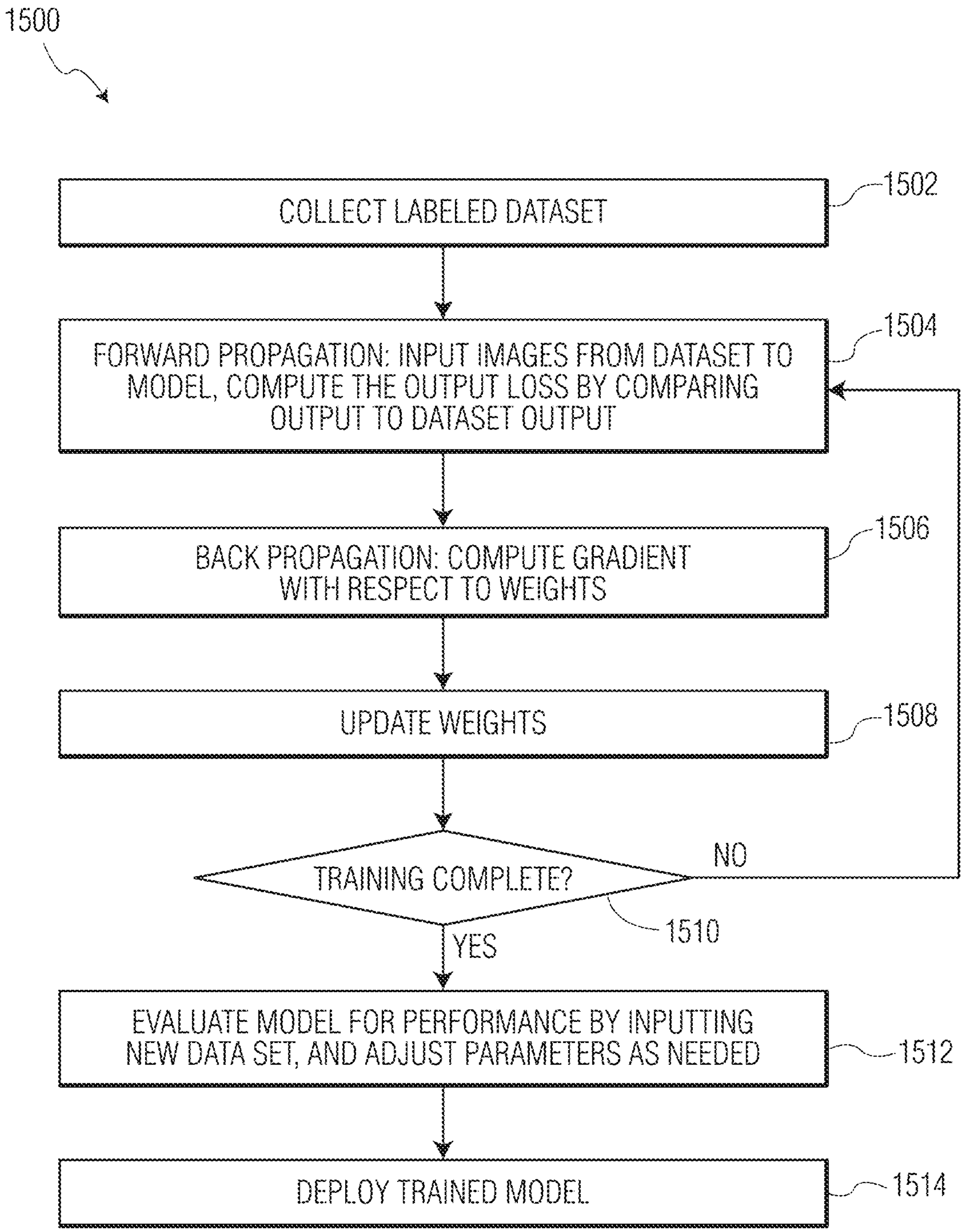
FIG. 15 shows a flowchart of the training of the encoder/decoder for acoustic communication for the system of underwater swarm of robotic fish for monitoring and telepresence, according to an example embodiment of the present disclosure.

In order to be able to accurately encode/decode the images, the encoder/decoder algorithm may be trained based on a labeled dataset of original and compressed images. FIG. 15 shows a flowchart 1500 of the training of the encoder/decoder for acoustic communication for the system of underwater swarm of robotic fish for monitoring and telepresence. For example, in step 1502, a labeled dataset of original and compressed image pairs are collected. In step 1504, the training algorithm performs forward propagation where the original images of the dataset are input to the model and the model computes the output compressed image and compares the dataset images to determine loss. Back propagation (e.g., based on an ADAM optimizer) may then be performed in step 1506 by computing a gradient with respect to the weights. In step 1508 the weights are updated and in step 1510 a determination is made as to whether the training is complete or not. If training is not complete, the steps 1504-1508 are repeated. If training is complete, the algorithm evaluates the model in step 1512 for performance by inputting a new data set (different from the training data set), and adjusts model parameters (e.g., hyperparameters) as needed. Once the model is adjusted, the model may then be deployed into the fish 108 in step 1514. While deployed in fish 108, the model may periodically be evaluated and updated by the control station.

As mentioned above, the swarm of robotic fish 108 may coordinate with one another to capture data and images of an underwater environment. In one example, robotic fish 108 may coordinate with one another to provide a mapping of an underwater structure. For example, the sinker 106 may be deployed adjacent to an underwater structure and capture perspective images of the underwater structure. The fish 108 may be deployed to autonomously navigate around all sides of the underwater structure including sides that are not visible to the cameras of sinker 106. While navigating around the underwater structure, fish 108 may capture images and collect sensor data. After collection and image transfer to the sinker, the images are used for 3D cloud point reconstruction of the underwater environment/structure. The operator may then view the underwater structure from the perspective of sinker 106 and view augmented data and images captured by fish 108. In other words, the operator may view the underwater structure as if they were diving in the position of sinker 106. The operator may then view other images of video feeds from the fish 108 as desired. This allows the operator to explore the underwater structure from all perspectives. It is noted that images captured by fish 108 may also be stitched together to form larger images of portions of the underwater structure that are not visible to sinker 106. This may allow the operator to view the underwater structure as if they were diving in the position of the robotic fish. It is noted that the robotic fish 108 may be autonomously controlled (e.g., using visual servoing algorithms for navigation) and coordinate with one another based on mission parameters/goals to capture such images of the underwater structure, or they may be manually controlled by the operator.

In another example, robotic fish 108 may coordinate with one another to map the seafloor. For example, multiple robotic fish may align with one another across a cross section of the seafloor, acting as a collective wide aperture scanner. The robotic fish 108 may maintain specific pattern formation (e.g., a line) by applying visual servoing control law, based on images taken from the lateral cameras, processed by an object detection algorithm (e.g., Yolo5) executing on the edge. Alternatively, the robotic fish identifies neighbors based on acoustic localization. Both techniques facilitate the identification of neighboring fish, keeping a preset distance and alignment by properly controlling the actuators in order to guarantee the formation. The multiple robotic fish may then proceed to travel along the seafloor in a coordinate line capturing synchronized images and collecting synchronized data. The distance between the fish may be set based on various factors including but not limited to the number of available fish, desired resolution of the seafloor map and others. The result is that the synchronized images captured by multiple fish 108 may be stitched together to form a map of the seafloor that can be viewed or explored virtually by the operator as if they were swimming along the seafloor.

In either case, the captured data and images are utilized to produce images or virtual environments of the seafloor and structures on the seafloor that are viewable/explorable by the operator as if they were a diver at the location. This is beneficial in that the human divers are no longer needed. Underwater environments can be explored in a safe manner by relying on the coordination of the sinker 106 and robotic fish 108.

It is noted that the mapping of the underwater environment may be performed in real-time as the operator us using the system or may be performed prior to the operator using the system. In other words, the system may control the system to autonomously explore and map the entire underwater environment of interest and store the desired images and data for later viewing. At a later time, the operator can then explore the underwater environment as it was previously recorded by the sinker and the fish.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A system of underwater swarm of robotic fish for monitoring and telepresence, the system comprising:

a floating platform communicatively coupled to a controller;

a submersible sinker communicatively coupled to the floating platform; and a plurality of underwater drones communicatively coupled to the submersible sinker, each of the plurality of underwater drones and the submersible sinker comprising an optical transceiver, wherein the controller is configured to:

receive instructions from an operator for remotely exploring an underwater environment using the submersible sinker and the plurality of underwater drones, transmit the instructions to the plurality of underwater drones via the floating platform and the submersible sinker, the instructions directing the plurality of underwater drones to navigate the underwater environment and collect data, wherein the plurality of underwater drones coordinate with one another to position the optical transceivers of the plurality of underwater drones in an optical chain with respect to the submersible sinker to support optical communication relayed between the plurality of underwater drones and the submersible sinker in the underwater environment, receive the collected data from the plurality of underwater drones via the floating platform and the submersible sinker, and display the collected data to the operator via a virtual display.

2. The system of claim 1, wherein the floating platform comprises a wireless communication interface configured to wirelessly communicate with the controller, and a wired communication interface electrically connected to the submersible sinker located in the underwater environment.

3. The system of claim 1, wherein the submersible sinker comprises an omnidirectional camera configured to capture omnidirectional images or video of the underwater environment.

4. The system of claim 1, wherein the plurality of underwater drones each comprise a thruster propeller, a sensor for collecting the data, and a camera for capturing images of the underwater environment.

5. The system of claim 1, further comprising:

a user input interface for providing the instructions to the controller for remotely exploring an underwater environment, wherein the virtual display comprises a virtual reality (VR) headset worn by the operator to display the collected data to the operator and display images captured by at least one of the submersible sinker or the underwater drones.

6. The system of claim 1, wherein in response to the instructions, the submersible sinker reaches a desired water depth and captures images of the underwater environment and the plurality of underwater drones coordinate navigation throughout the underwater environment to collect the data.

7. The system of claim 1, wherein the submersible sinker and the plurality of underwater drones have acoustic transceivers and optical transceivers for supporting communication in the underwater environment.

8. The system of claim 1, wherein the underwater drones are further configured to determine respective positions in the underwater environment by executing a beaconless algorithm that fuses dead reckoning data and relative trilateration data for collective localization.

9. The system of claim 7, wherein the plurality of underwater drones are further configured to encode images in the collected data using an encoding algorithm and transmit the encoded images to the submersible sinker, the encoding algorithm comprising applying multiple convolutional layers until the images are compressed to a predetermined size, converting values of the compressed images to binary values and transmitting the binary values to the submersible sinker, and wherein the encoding algorithm is trained by performing forward propagation and back propagation through a model using a predetermined dataset.

10. A method of operating an underwater swarm of robotic fish for monitoring and telepresence, the method comprising:

receiving, by a controller, instructions from an operator for remotely exploring an underwater environment using a submersible sinker and a plurality of underwater drones each of the plurality of underwater drones and the submersible sinker comprising an optical transceiver, the controller communicatively coupled to a floating platform, the submersible sinker communicatively coupled to the floating platform, and the plurality of underwater drones communicatively coupled to the submersible sinker;

transmitting, by the controller, the instructions to the plurality of underwater drones via the floating platform and the submersible sinker, the instructions directing the plurality of underwater drones to navigate the underwater environment and collect data, wherein the plurality of underwater drones coordinate with one another to position the optical transceivers of the plurality of underwater drones in an optical chain with respect to the submersible sinker to support optical communication relayed between the plurality of underwater drones and the submersible sinker in the underwater environment;

receiving, by the controller, the collected data from the plurality of underwater drones via the floating platform and the submersible sinker; and displaying, by the controller, the collected data to the operator via a virtual display.

11. The method of claim 10, further comprising:

wirelessly communicating between the floating platform and the controller via a wireless communication interface of the platform; and communicating between the floating platform and the submersible sinker located in the underwater environment via a wired connection between the floating platform and the submersible sinker.

12. The method of claim 10, further comprising:

capturing, by an omnidirectional camera of the submersible sinker, omnidirectional images or video of the underwater environment.

13. The method of claim 10, further comprising:

propelling, by a thruster propeller, the plurality of underwater drones through the underwater environment; and collecting the data, by a sensor of the plurality of underwater drones, and capturing images of the underwater environment by cameras of the plurality of underwater drones.

14. The method of claim 10, further comprising:

providing, by a user input interface, the instructions to the controller for remotely exploring an underwater environment; and displaying, by the virtual display comprising a virtual reality (VR) headset worn by the operator, the collected data to the operator and display images captured by at least one of the submersible sinker or the underwater drones.

15. The method of claim 10, further comprising:

capturing, by the submersible in response to the instructions, images of the underwater environment and the plurality of underwater drones coordinate navigation throughout the underwater environment to collect the data.

16. The method of claim 10, further comprising:

supporting, by acoustic transceivers and optical transceivers of the submersible sinker and the plurality of underwater drones, communication in the underwater environment.

17. The method of claim 10, further comprising:

determining, by the underwater drones, respective positions in the underwater environment by executing a beaconless algorithm that fuses dead reckoning data and relative trilateration data for collective localization.

18. The method of claim 10, further comprising:

training an encoding algorithm by performing forward propagation and back propagation through a model using a predetermined dataset of images;

encoding, by the plurality of underwater drones, the images in the collected data using the encoding algorithm that applies filters to the images in multiple convolutional layers until the images are compressed to a predetermined size, and converts values of the compressed images to binary values and transmitting the binary values to the submersible sinker; and transmitting, by the plurality of underwater drones, the encoded images to the submersible sinker.

* * * * *